US 6,563,888 B1

(12) United States Patent
Toriyama

(10) Patent No.: US 6,563,888 B1
(45) Date of Patent: May 13, 2003

(54) DATA TRANSMISSION/RECEPTION SYSTEM AND DATA RECEPTION DEVICE

(75) Inventor: Hideyuki Toriyama, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/413,224

(22) Filed: Oct. 5, 1999

(30) Foreign Application Priority Data

Oct. 6, 1998 (JP) .......................................... 10-284624
Nov. 8, 1998 (JP) .......................................... 10-286496
Dec. 3, 1998 (JP) .......................................... 10-344137

(51) Int. Cl.$^7$ .............................. H03D 1/00; H04L 27/06
(52) U.S. Cl. ....................... 375/340; 375/355; 375/371; 370/503; 370/518
(58) Field of Search ......................... 355/133; 382/312, 382/325; 375/259, 219, 316, 324, 340, 354, 355, 359, 365, 369, 371, 377; 370/503, 516, 517, 518

(56) References Cited

U.S. PATENT DOCUMENTS 4,694,472 A * 9/1987 Torok et al. ................. 375/354
5,451,894 A * 9/1995 Guo ............................ 327/241

FOREIGN PATENT DOCUMENTS

JP          8-32629           2/1996
JP          8-258329          10/1996

* cited by examiner

Primary Examiner—Jean Corrielus
(74) Attorney, Agent, or Firm—Sidley Austin Brown & Wood LLP

(57) ABSTRACT

A data transmission/reception system made up of a transmission device for transmitting data according to a transmission clock signal and a reception device for receiving the data according to a reception clock signal. On receiving synchronization data representing the transmission clock signal from the transmission device, the reception device generates the reception clock signal which is synchronous to the transmission clock signal using a PLL circuit, and notifies the transmission device of an input voltage applied to a VCO in the PLL circuit on completing PLL processing. The transmission device adjusts a frequency of the transmission clock signal based on the notified input voltage so that the reception clock signal will be synchronized to the transmission clock signal at a median frequency in a synchronous range of the VCO in the PLL circuit. The reception device samples image data transmitted from the transmission device, in accordance with the reception clock signal which is synchronous to the transmission clock signal of the adjusted frequency.

11 Claims, 25 Drawing Sheets

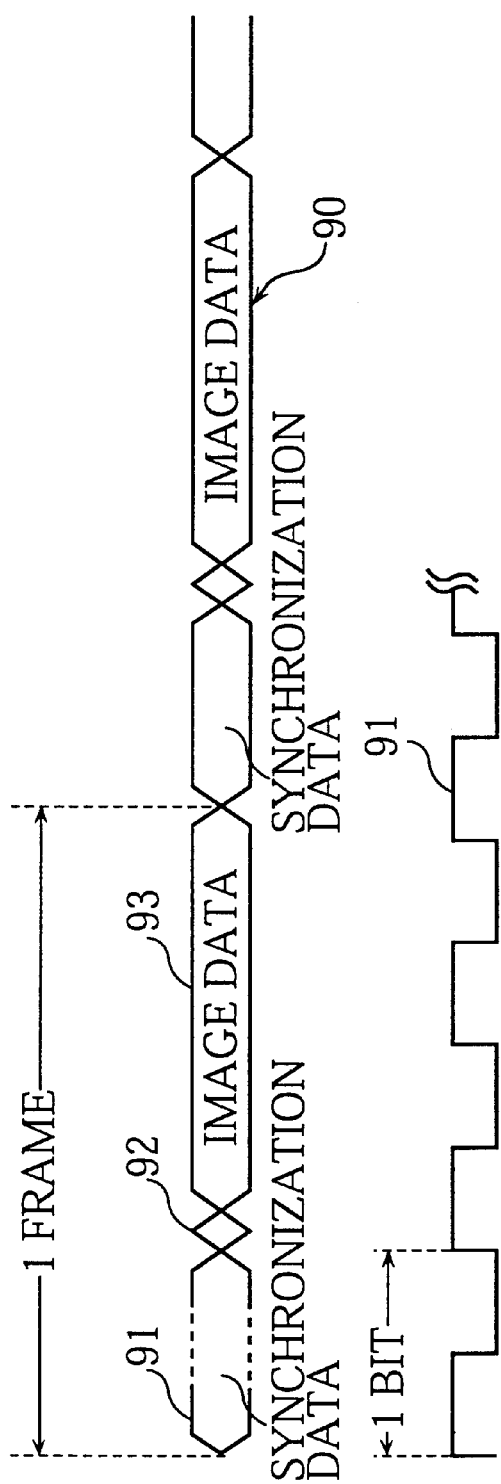
Fig. 6A
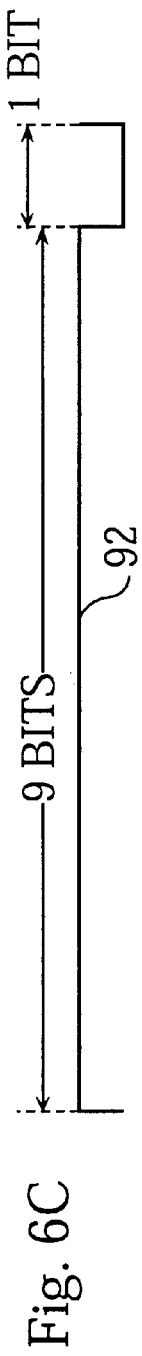
Fig. 6B
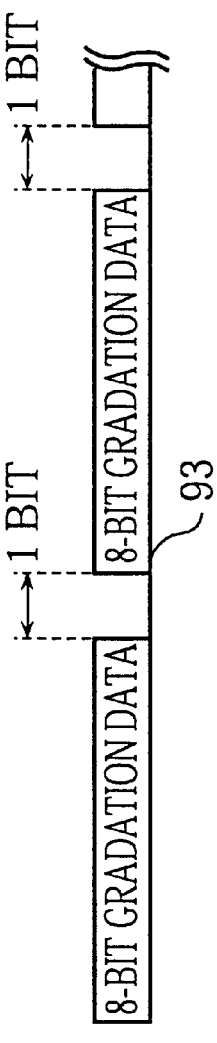
Fig. 6C
Fig. 6D

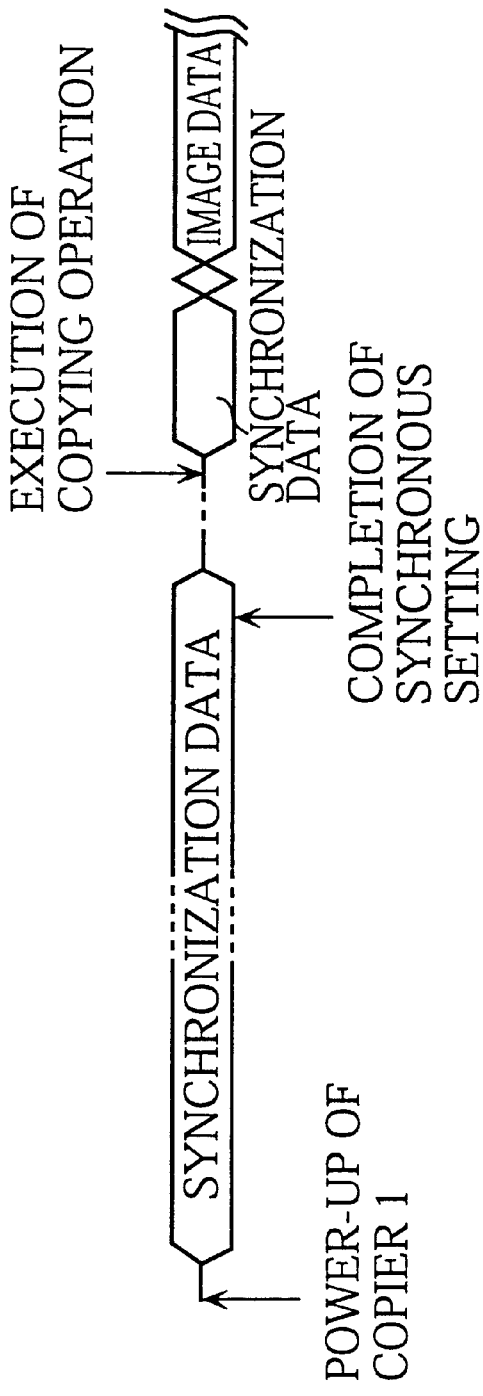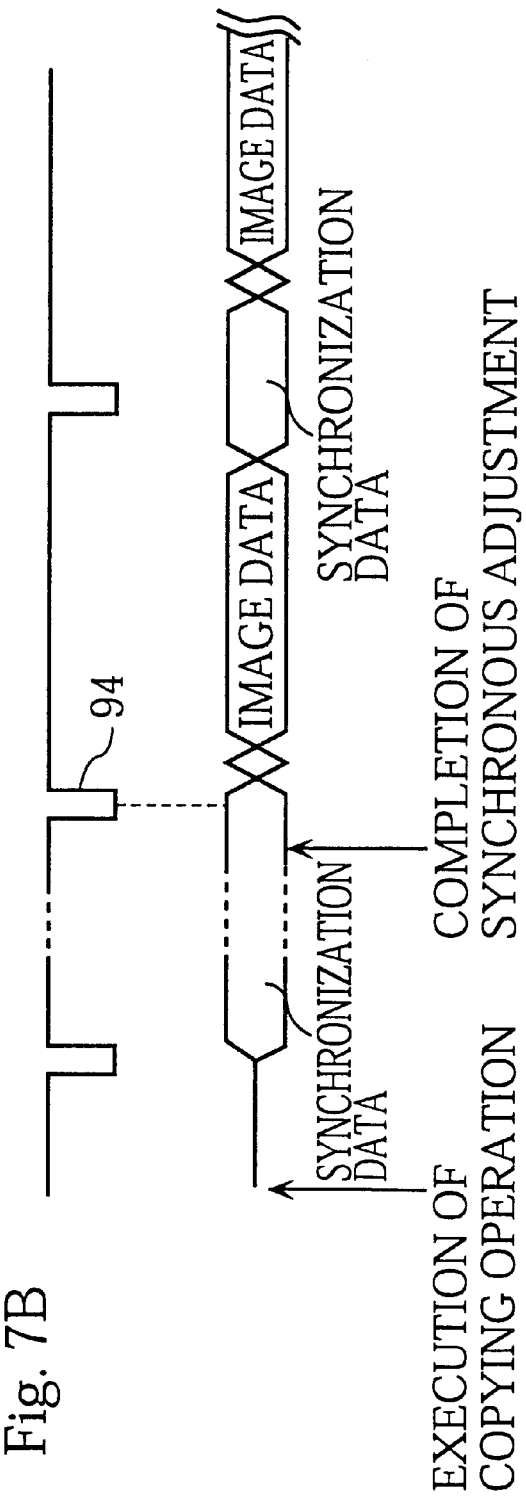

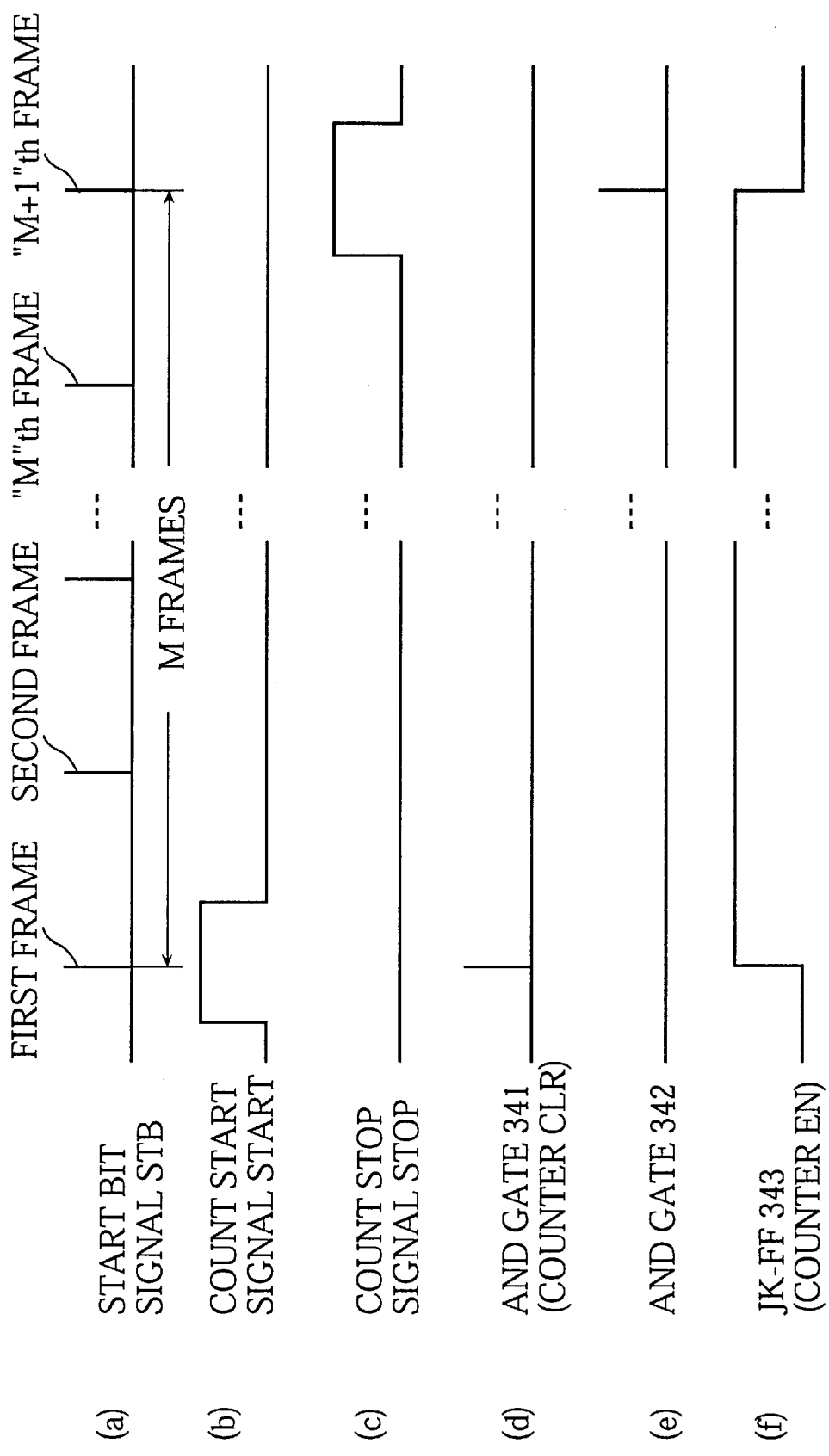

DATA TRANSMISSION/RECEPTION SYSTEM AND DATA RECEPTION DEVICE

This application is based on applications Nos. 10-284624, 10-286496, and 10-344137 filed in Japan, the contents of which are hereby incorporated by reference.

BACKGROUND OF THE INVENTION

1. Field of the Invention

The present invention relates to a data transmission/reception system, data reception device, and data transmission/reception method for synchronizing data transfer between the transmitter and the receiver.

2. Description of the Related Art

An image forming apparatus such as a digital copier (hereinafter "copier") performs image forming as follows: having a laser diode (LD) modulate based on image data read from a document to emit a laser beam, forming an electrostatic latent image on the surface of a photosensitive drum, developing the electrostatic latent image into a visible toner image with a developer, and transferring the toner image onto a transfer sheet.

In such an apparatus, data is transmitted/received between an image reading unit that reads the image data from the document and a printing unit that forms the electrostatic latent image by means of the LD modulation using the read image data.

For fast copying operations of the copier, the image data needs to be sent from the image reading unit to the printing unit at high speed. One method used for high-speed data transmission is a bit serial data transmission method.

In this method, the transmitter sends transmission data according to a predetermined clock signal (transmission clock signal), where the transmission data is made up of frames that each include a synchronization signal alternating between "0" and "1" bit-by-bit followed by information data of 8-bit strings representing textual or image information. The receiver receives the synchronization signal, generates a clock signal (reception clock signal) whose frequency and phase are equal to the synchronization signal, and samples the information data that follows using the reception clock signal.

For such data transmission/reception to be accurately performed, it is essential to match (synchronize) phases between the frequency of the transmission clock signal and the frequency of the reception clock signal. One example of synchronous methods is a PLL (Phase-Locked Loop).

FIG. 1 shows the general configuration of a PLL. In the figure, the PLL is roughly composed of a phase comparator 401, a lowpass filter (LPF) 402, and a voltage controlled oscillator (VCO) 403. The PLL has the VCO 403 generate a signal of a frequency in sync with a frequency (reference frequency 411) of an external input signal, in the following manner.

First, the phase comparator 401 compares an input comparison frequency 411 with the reference frequency 412 and outputs a signal 413 corresponding to a phase difference of the two frequencies to the LPF 402. The LPF 402 outputs a direct current component 414 obtained through the elimination of high frequency components from the signal 413 to the VCO 403. The VCO 403 is an oscillator whose output frequency varies with an input voltage, and outputs a signal of a frequency corresponding to a voltage of the direct current component 414. The signal outputted from the VCO 403 is then returned back to the phase comparator 401 with its frequency as the comparison frequency 412.

Alternatively, a frequency divider 404 may be inserted between the VCO 403 and the phase comparator 401. In this case, the comparison frequency 412 will be the result of frequency dividing the signal outputted from the VCO 403 by N (N is an integer no less than 1), so that the two signals will be synchronized where the VCO 403 oscillates at a frequency N times as large as the reference frequency 411.

As a result of repeating the above process of comparing the phase of the incoming reference frequency 411 with the phase of the comparison frequency 412 outputted from the VCO 403 and changing the input voltage of the VCO 403 based on the phase difference, the signal of the frequency (frequency N times as large as the reference frequency 411 if the frequency divider 404 is inserted) in sync with the reference frequency 411 is generated from the VCO 403.

Such PLLs are used in copiers to bring the frequency (equivalent of the comparison frequency 412) of the reception clock signal in the printing unit (receiver) into sync with the frequency (equivalent of the reference frequency 411) of the transmission clock signal outputted from the image reading unit (transmitter).

Synchronous processing in a copier has two main stages. The first synchronous processing is referred to as "synchronous setting" that is performed prior to copying operations, such as when the copier is powered up. In this stage the transmission clock signal and the reception clock signal are synchronized at a predetermined frequency (hereafter "synchronization frequency") in preparation for copying operations. The synchronization frequency is generally set according to the standard (voltage-frequency characteristic) of a VCO that generates the reception clock signal.

The second synchronous processing is referred to as "synchronous adjustment" that is performed each time a copying operation is executed or each time copying operations for a predetermined volume are completed. The synchronous adjustment is to recover the reception clock frequency, that gradually deviates from the synchronization frequency due to leakage currents occurring in the PLL during standby or data transmission/reception, to be synchronous to the synchronization frequency.

Given increasing demands for faster image forming of copiers, transfer rates of image data directly affect the performance of the machine, so that it is desirable to minimize the time taken for the synchronous adjustment that is the preprocessing of the image data transfer. The synchronous adjustment time depends on the synchronization frequency which has been set during the synchronous setting.

FIG. 2 shows the voltage-frequency characteristic of the VCO. Although the VCO changes its output frequency relative to an input voltage, the PLL can perform synchronization only within a synchronous range shown by solid line 501. Besides, there is a property that synchronous processing takes more time when the synchronization frequency is around the upper limit Fa or lower limit Fb (point H or L) of the synchronous range, than when the synchronization frequency is around median frequency Fm (point M) of the synchronous range. This is because leakage currents increase as the synchronization frequency approximates to the upper or lower limit of the synchronous range, thereby causing a greater frequency deviation. It is therefore preferable to set the synchronization frequency at around point M (frequency Fm, input voltage Vm) in the synchronous range.

Accordingly, in the synchronous setting the image reading unit (transmitter) outputs a signal of frequency Fm at point M to the printing unit (receiver) as the transmission clock signal, and the printing unit activates the PLL with frequency Fm as the reference frequency (synchronization frequency) to synchronize the reception clock signal to the transmission clock signal.

Nevertheless, the frequency band of the VCO synchronous range varies with changes in solid state and use environment of the copier, so that the transmitter outputting a signal at a predetermined frequency (Fm in FIG. 2) does not necessarily mean the receiver synchronizing with the transmitter at the center (around point M) of the synchronous range. There may be cases where the synchronization frequency is set at a frequency band (e.g. around point H or L) which is undesirable for the synchronous adjustment.

Especially, the synchronous range becomes smaller if a VCO with a crystal of a narrower frequency variable range is used in order to stabilize transfer rates. To perform synchronization at the center of the synchronous range in such a case is even more difficult.

FIG. 3 shows a change of the synchronous range in the receiver's VCO caused by the variation of use environment of the VCO. Solid line 501 shows the synchronous range before the change (same as FIG. 2), while solid line 601 shows the synchronous range after the change. The synchronous range has decreased in frequency in this example. Note here that according to the VCO characteristic the synchronous range varies in frequency with changes in solid state or use environment of the VCO but is stable in input voltage (Va~Vb in FIGS. 2 and 3) regardless of such changes.

Suppose the transmitter outputs a transmission clock signal of frequency Fm to the receiver so that synchronization be performed at point M, without knowing the synchronous range of the receiver's VCO has changed. Then the transmission clock signal and the reception clock signal are synchronized at around point N which is close to the upper limit of the new synchronous range, instead of around point M' which is the center of the new synchronous range. Synchronous processing (synchronous adjustment) performed at point N takes more time than synchronous processing performed at point M', which results in a decrease in data transfer efficiency.

As mentioned above, the PLL is made up of a closed loop circuit including the VCO, the phase comparator, and the LPF. In the PLL the synchronization signal and the clock signal from the VCO are inputted into the phase comparator, which detects phase components (phase difference) of the two signals, converts the phase difference to a pulse signal (phase difference signal) and outputs the phase difference signal to the LPF.

The LPF is mainly composed of a resistor and a capacitor. The LPF removes unwanted noise components from the phase difference signal, converts the phase difference signal to a direct voltage, and outputs the voltage to the VCO. The VCO changes the phase of the clock signal to a direction such that the phase difference disappears, and outputs the clock signal to the phase comparator. By repeating this process, the phase of the clock signal approximates to the phase of the synchronization signal and eventually the two signals become in phase with each other (this process is called "phase equalization") Specifically, the phase equalization is performed so as to diminish the phase difference between the same-directional edges (rising edges) of the synchronization signal and the clock signal.

However, even if the clock signal is made in phase with the synchronization signal by the phase equalization, subsequent occurrence of leakage currents in the PLL causes gradual changes in frequency and phase of the clock signal over the course of time. Therefore, for accurate sampling of information data it is desirable to perform the phase equalization on each frame.

However, in the above bit serial data transmission method using the PLL that receives serial data via only a transmission line, there is a problem of low transmission rate due to inability to receive information data while receiving a synchronization signal. To improve the transfer efficiency in such a method, it may be considered appropriate to minimize the time for transmitting the synchronization signal. However, given that the PLL is made up of the closed loop circuit that reduces the phase difference by steering the frequency of the VCO relative to the phase difference, the larger the phase difference, the more time is necessary for the phase equalization. Accordingly, the transmission time of the synchronization signal has to be long enough for the phase equalization to be reliably executed even when the phase difference of the two signals is largest, that is, when the two signals is 180° out of phase. Otherwise, the phase equalization may not be able to be completed during reception of the synchronization signal. When this happens, information data will be sampled using clock pulses of a frequency different from the synchronization signal and as a result accurate information data will not be obtained. This seriously undermines the communication reliability of the copier.

Such a problem is not limited to methods of generating clock signals using PLLs but can be present in any data reception device which generates a clock signal in phase with an incoming synchronization signal.

The asynchronous serial transmission method is a data transmission method whereby the system can be configured at low cost, since it requires only a transmission line.

In this method, the transmitter sends serial data in frames that are each made up of synchronization data including start bit data and effective data of 8-bit strings such as image gradation data and textual data, via the transmission line according to a transmission clock signal.

The receiver which receives the serial data is a conventional data reception device that is provided with a crystal oscillator. The receiver includes an oscillator for generating a reception clock signal which is similar to the transmission clock signal in frequency and is asynchronous to the transmission clock signal, a delay circuit for generating multiple delayed clock signals that are equal to the reception clock signal in frequency but differ with the reception clock signal in phase, and a phase detecting unit for selecting, based on the synchronization data, one of the delayed clock signals whose phase approximately matches the transmission clock signal in the first bit time of effective data of a frame. With this construction, it is possible to position a reading edge of the synchronization signal at around the center of the first bit time of the effective data. Accordingly, the data setup time and the data hold time can be made approximately equivalent. Assume the crystal oscillator has a normal error (plus or minus several tens of ppm). For effective data roughly corresponding to gradation data of a line read from a document by the image reading unit at 1400 dpi, sending this effective data in a frame will not cause failures of reading a level shown by each bit and so the effective data can be reliably latched.

However, in view of the recent trend of increasing amounts of data to be transferred per frame associated with denser document reading rates of such as 1600 dpi, even a slight error of the crystal oscillator will cause gradual deviation of each reading edge of the synchronization clock signal from the center of a bit time towards the phase advance direction or the phase delay direction, over the first bit time to last bit time of the effective data. In other words, if the amount of effective data in a frame is increased to meet the currently demanded level, the data setup time or the data hold time becomes shorter over time, which will eventually cause reception errors. Thus, with the conventional method the amount of data to be transferred per frame cannot be increased and so the data transfer efficiency remains low.

Though this problem may be solved by using a crystal oscillator whose error is smaller than the normal error, such a crystal oscillator is very expensive, so that manufacturing data reception devices with such crystal oscillators would be costly.

SUMMARY OF THE INVENTION

In view of the above problems, the present invention aims to improve the efficiency of the data transfer from the transmitter to the receiver.

The above object can be fulfilled by a data transmission/reception system that includes a transmission device for transmitting data according to a transmission clock signal and a reception device for receiving the data according to a reception clock signal, the transmission device including: a transmission clock signal generator which generates the transmission clock signal; a reception clock signal information receiver which receives information about the reception clock signal from the reception device; and a controller which controls a frequency of the transmission clock signal in accordance with the received information, and the reception device including: a reception clock signal generator which generates the reception clock signal in such a manner that the reception clock signal is synchronized to the transmission clock signal; and a reception clock signal information outputting unit which outputs the information about the reception clock signal when synchronization of the reception clock signal to the transmission clock signal is completed in the reception clock signal generator, to the transmission device.

With this construction, the transmission device receives the information about the reception clock signal which has been synchronized to the transmission clock signal from the reception device, and adjusts the frequency of the transmission clock signal based on the received information. Accordingly, time taken for synchronous processing in data transmission/reception is reduced, so that data can be transferred with efficiency.

Here, the information sent from the reception device to the transmission device may be an input voltage applied to a VCO in a PLL used in the reception device for synchronization between the two clock signals. Accordingly, the transmission device can optimally adjust the frequency of the transmission clock signal based on the notified input voltage.

The above object can also be fulfilled by a data reception device for receiving transmission data that includes synchronization data and effective data, the data reception device including: a clock pulse generator which generates a clock pulse; a selecting unit which detects phase differences between same-directional edges of the generated clock pulse and a transmission clock pulse included in the received synchronization data and between opposite-directional edges of the clock pulse and the transmission clock pulse, and selects a combination of edges whose phase difference is smallest among the detected phase differences; a phase adjusting circuit which adjusts a phase of the clock pulse to eliminate the phase difference of the selected combination of edges; and a sampling circuit which samples the effective data according to the clock pulse whose phase has been adjusted.

With this construction, the phase of the clock pulse generated in the data reception device is adjusted so as to eliminate the smallest phase difference among phase differences of the clock pulse and transmission clock pulse shown by the received synchronization data, on their same-directional edges and opposite-directional edges. In so doing, an amount of phase adjustment is reduced compared with the conventional method which concerns only the phase difference of the clock pulse and transmission clock pulse on their same-directional edges. Accordingly, time required for the phase adjustment is reduced, with it being possible to accelerate transmission of the synchronization data and so increase the data transfer efficiency.

The above object can also be fulfilled by a data reception device for receiving serial data including a plurality of frames which each include synchronization data and effective data, the data reception device including: a reception clock signal generator which generates a reception clock signal whose frequency is approximately equal to a frequency of a transmission clock signal, the reception clock signal being asynchronous to the transmission clock signal; a delayed clock signal outputting unit which outputs, in accordance with the synchronization data, a delayed clock signal whose phase approximately matches a phase of the transmission clock signal, the delayed clock signal being created by delaying a phase of the reception clock signal; an adjustment amount obtaining unit which obtains a phase adjustment amount according to a frequency difference of the reception clock signal with the transmission clock signal; and a setting unit which sets a synchronization clock signal for capturing effective data included in the frame, in accordance with the phase adjustment amount and the delayed clock signal.

With this construction, the data reception device selects the delayed clock signal which has been created by delaying the reception clock signal equal to the transmission clock signal in frequency and which approximately matches the phase of the transmission clock signal, and acquires the amount of phase adjustment based on the frequency difference of the reception clock signal with the transmission clock signal. The data reception device then determines the optimal synchronization clock signal with reference to the delayed clock signal and amount of phase adjustment. Accordingly, even when there is a certain frequency error between the transmission clock signal and the reception clock signal, a large amount of effective data can be reliably sampled without failing to read a level of each bit of the effective data. As a result, the amount of effective data in a frame can be increased, which contributes to an improvement in data transfer efficiency.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIGS. 6A~6D are schematic diagrams showing the structure of serial data transmitted/received in the copier;

FIGS. 7A and 7B are timing charts which each show the relation between serial data and horizontal synchronizing signals;

FIG. 27 shows waveforms of signals present in an operation coefficient setting unit in the data reception device.

DESCRIPTION OF THE PREFERRED EMBODIMENT(S)

The following is a description of the embodiments of the present invention with reference to the figures, taking a copier as an example.

First Embodiment (1) General Configuration of Copier

Figure 4:
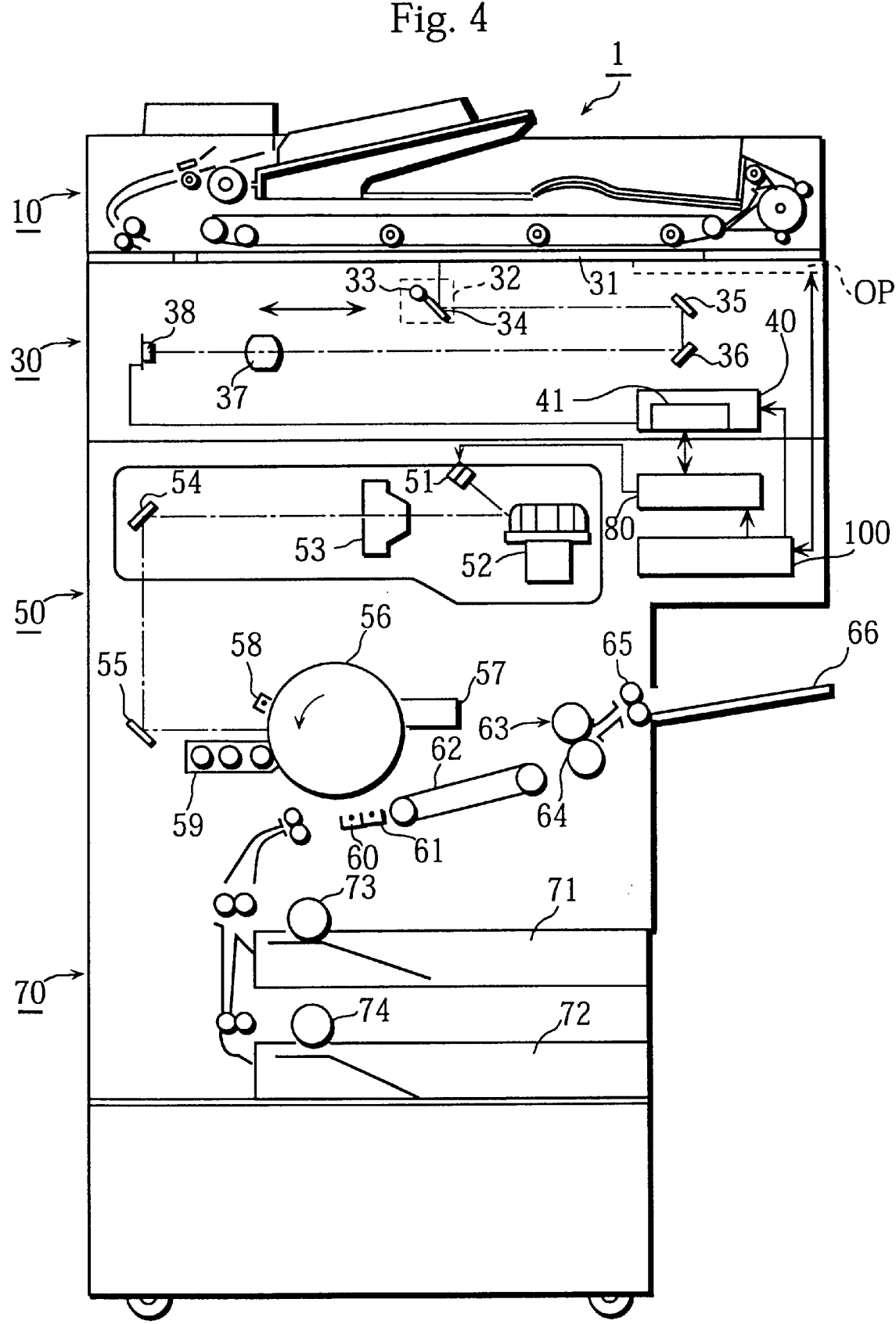
FIG. 4 shows the general configuration of a copier provided with a data transmission/reception system of the first embodiment of the present invention.

FIG. 4 shows the general configuration of a copier 1 in the first embodiment of the present invention.

In the figure, the copier 1 is roughly made up of an automatic document feeder (ADF) 10, an image reading unit 30, a printing unit 50, and a paper supplying unit 70.

The ADF 10 automatically transports documents one by one to a document reading position on a platen glass 31 of the image reading unit 30.

The image reading unit 30 is provided with a scanner 32, a CCD (Charge-Coupled Device) image sensor 38, and a transmitting unit 40, and optically reads an image of the document transported to the document reading position on the platen glass 31.

The scanner 32 is equipped with an exposure lamp 33 and a mirror 34. A light emitted by the exposure lamp 33 is reflected off the document, and the mirror 34 redirects the light to make the light path parallel to the platen glass 31. The scanner 32 moves in the direction indicated by the arrow shown in the figure to scan the document on the platen glass 31. After reflected off the document and redirected by the mirror 34, the light is guided to the CCD image sensor 38 via mirrors 35 and 36 and a converging lens 37. The CCD image sensor 38 then converts the light into electric signals to generate image data.

The transmitting unit 40 converts the image data outputted from the CCD image sensor 38 into multivalued digital signals, corrects the image data and temporarily stores the data into a memory. The transmitting unit 40 then transmits the image data to the printing unit 50 for scanning. Before transmitting the image data, the transmitting unit 40 performs synchronous processing to synchronize with the receiver (printing unit 50). This synchronous processing of the transmitting unit 40 will be detailed later.

The printing unit 50 forms an image on a recording sheet using a well-known electrophotographic method and includes a receiving unit 80, a photosensitive drum 56, a developing unit 59, and so on.

The receiving unit 80 receives the image data from the transmitting unit 40 of the image reading unit 30. The operation of the receiving unit 80 will be detailed later.

The image data received by the receiving unit 80 is converted to a driving signal of a laser diode (LD) 51 which accordingly emits a laser beam. The laser beam is reflected off a facet of a polygon mirror 52 that rotates at a predetermined angular speed, and scans the surface of the photosensitive drum 56 through an fθ lens 53 and mirrors 54 and 55.

Before the scanning, a cleaning unit 57 removes remaining toner particles from the surface of the photosensitive drum 56. Also, an eraser lamp (not illustrated) neutralizes any surface potential remaining on the surface of the photosensitive drum 56, and a sensitizing charger 58 uniformly charges the surface of the photosensitive drum 56. When the surface of the photosensitive drum 56 is scanned by the laser beam in this charged state, an electrostatic latent image is formed on the surface of the photosensitive drum 56.

The developing unit 59 develops the electrostatic latent image formed on the surface of the photosensitive drum 56 into a visible toner image.

The paper supplying unit 70 includes paper cassettes 71 and 72. In sync with the exposure and development operations on the photosensitive drum 56, a recording sheet of a required size is fed from the paper cassette 71 or 72 by a corresponding feeding roller 73 or 74. The recording sheet comes in contact with the surface of the photosensitive drum 56 at the bottom of the photosensitive drum 56. By means of static electricity of a transfer charger 60, the toner image formed on the surface of the photosensitive drum 56 is transferred onto the recording sheet.

Subsequently, the recording sheet is separated from the surface of the photosensitive drum 56 by static electricity of a separation charger 61 and transported to a fixing unit 63 by a transport belt 62.

The toner image transferred onto the recording sheet is fixed by the fixing unit 63 using a fixing roller 64 provided with a heater. By the application of heat from the heater, the toner particles are fused and fixed in place on the recording sheet. The recording sheet is then discharged onto a discharge tray 66 by a discharge roller 65.

On receiving indications (e.g. the number of copies to make, 1-sided or 2-sided copying, and copying start) from the user through an operation panel (OP), a controlling unit 100 notifies the indications to each component of the copier 1 and controls the processing timing of each component so that the copying operation will be smoothly performed.

The controlling unit 100 also announces user indications on power-up of the copier 1 and subsequent copying operation to the image reading unit 30 and printing unit 50 to adjust the timing of the synchronous processing (synchronous setting at power-up of the copier 1 and synchronous adjustment at each copying operation).

Further, in the transfer of the image data from the image reading unit 30 to the printing unit 50 for scanning in units of scan lines, the controlling unit 100 sends a horizontal synchronizing signal for each scan line to both the image reading unit 30 and printing unit 50 to adjust the transmission/reception timing.

(2) Configuration of Transmitting Unit 40

The configuration of the transmitting unit 40 in the image reading unit 30 that is the transmitter in the image data transmission/reception processing is explained below with the operation of each component in the transmitting unit 40.

Figure 5:
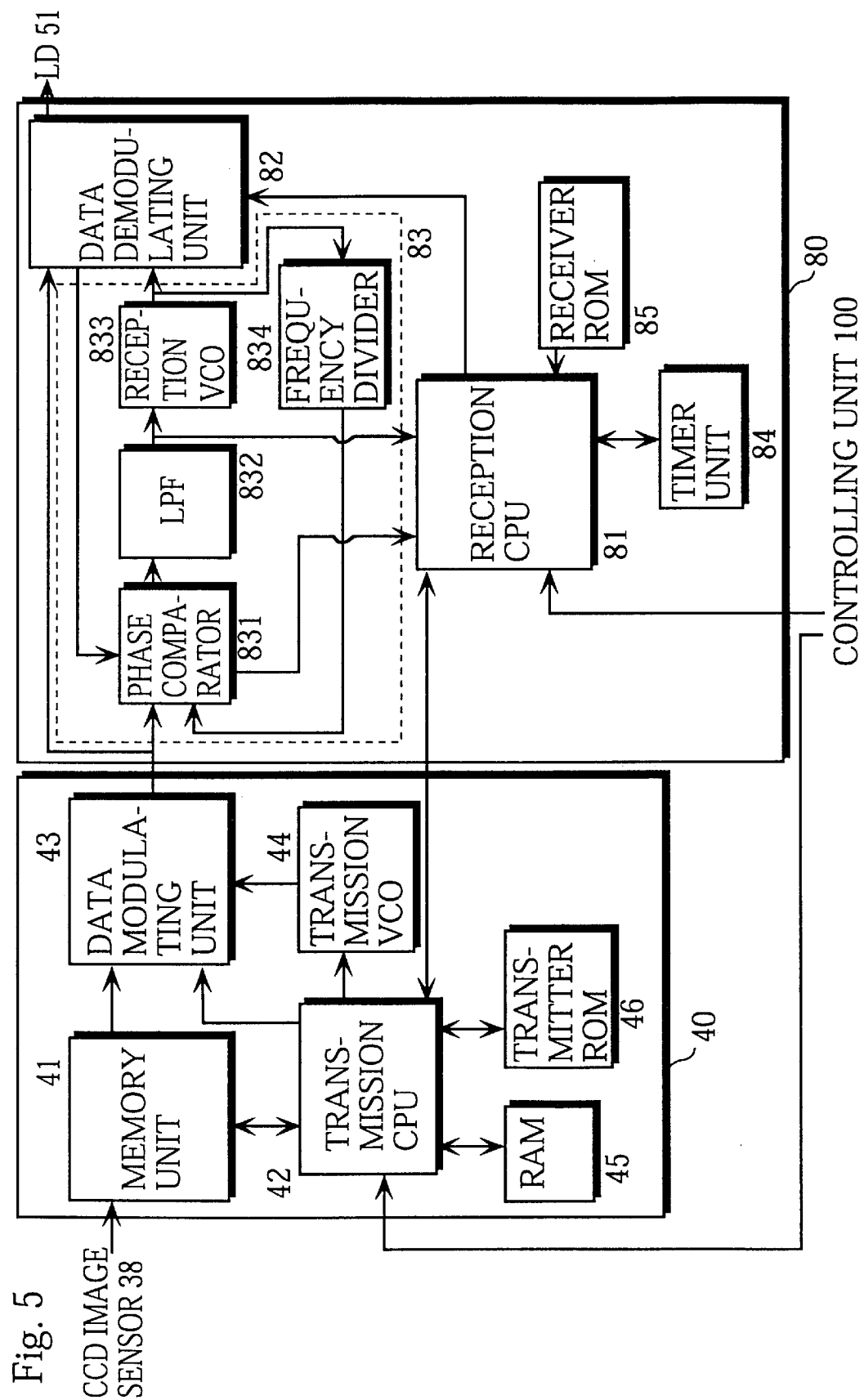
FIG. 5 is a block diagram showing the configuration of a transmitting unit and receiving unit that perform image data transmission/reception in the copier.

The transmitting unit 40 in the image reading unit 30 performs data transmission with the printing unit 50. As shown in FIG. 5, the transmitting unit 40 is mainly made up of a memory unit 41, a transmission CPU 42, a data modulating unit 43, a transmission VCO 44, a RAM 45, and a transmitter ROM 46. Data transmitted from the transmitting unit 40 to the printing unit 50 includes image data read from a document and data (synchronization data) to be sent prior to the image data for synchronous processing. Synchronization data alone is transmitted to the receiving unit 80 of the printing unit 50 in the synchronous setting performed immediately after power-up of the copier 1, whereas synchronization data followed by image data is transmitted in the synchronous adjustment performed on each copying operation.

The memory unit 41 converts the image data outputted from the CCD image sensor 38 into multivalued digital signals and performs necessary corrections and quality improvements on the image data, before storing the data into the embedded image data memory. The memory unit 41 manages the image data in the line data unit that is the processing unit for scanning.

The image data is transmitted to the receiving unit 80 in units of lines for scanning. The timing of starting the line data transmission is controlled by a horizontal synchronizing signal outputted from the controlling unit 100. Here, prior to the image data transmission it is necessary to synchronize a transmission clock signal and a reception clock signal, and accordingly synchronization data is transmitted to the receiving unit 80 in advance of the image data (line data).

FIGS. 6A–6D are schematic diagrams showing the structure of data (serial data) 90 transmitted from the transmitting unit 40. The serial data 90 in FIG. 6A is made up of a plurality of consecutive frames that each include synchronization data 91, start bit data 92, and image data 93. Each of the frames corresponds to data for one line (line data) in the memory unit 41, and the number of frames which make up the serial data 90 is equivalent to the number of lines in the image data (equivalent of the number of scan operations) stored in the memory unit 41. The image reading unit 30 sends serial data of one frame (line data) to the printing unit 50 each time it receives a horizontal synchronizing signal from the controlling unit 100.

Synchronization data is attached to image data in each line, wherein synchronization data attached to image data of the first line to be sent immediately after the start of a copying operation is larger than synchronization data attached to image data of each of the other lines. This is because the synchronous adjustment is performed each time a copying operation starts, so that transmission time for the synchronization data preceding the image data of the first line needs to be long enough for the synchronous adjustment to be completed. On the other hand, synchronization data attached to image data of each line thereafter can be smaller, since such synchronization data is used for resolving a frequency deviation occurring during transmission of image data of the immediately preceding line.

FIG. 6B shows the synchronization data 91 that is to be sent during the synchronous processing for image data transmission/reception between the transmitter and the receiver. The synchronization data 91 alternately shows "1" and "0" with two transmission clock pulses corresponding to one bit. The synchronization data 91 is generated by the data modulating unit 43.

The data form in FIG. 6B also applies to synchronization data which is singly transmitted to the receiving unit 80 in the synchronous setting.

FIG. 6C shows the start bit data 92 made up of 10 bits where the first 9 bits show "1" and the last bit shows "0". The start bit data 92 is used to specify the boundary between the synchronization data 91 and the image data 93, with the last bit showing "0" indicating that a bit which follows is the first bit of the image data 93. The start bit data 92 is generated by the data modulating unit 43.

FIG. 6D shows the image data 93 which is line data of the image data stored in the memory unit 41 and is made up of a set of 8-bit (corresponding to one pixel) gradation data. Each 8 bits of gradation data is followed by a bit showing "0" to avoid confusion with the start bit data 92.

While in the printing unit 50 the serial data 90 is converted into a driving signal of the LD 51 which emits a laser beam to form an electrostatic latent image in an image forming region on the surface of the photosensitive drum 56, the synchronization data 91 and the start bit data 92 in the serial data 90 do not relate to the image, so that they are not converted into the driving signal of the LD 51 and hence will not affect the image formed in the end.

The transmission CPU 42 executes a program stored in the transmitter ROM 46 to control overall transmission of serial data. The transmission CPU 42 is activated under control of the controlling unit 100 when the user powers up the copier 1 via the operation panel.

When activated (when the copier 1 is powered up), the transmission CPU 42 performs the following operation for the synchronous setting.

On being notified by the controlling unit 100 that the copier 1 has been powered up, the transmission CPU 42 activates the data modulating unit 43. The transmission CPU 42 also acquires an initial voltage from the RAM 45 and applies the initial voltage to the transmission VCO 44 via a D/A conversion terminal as an input voltage (the input voltage applied to the transmission VCO 44 is hereinafter referred to as "transmitter input voltage" to distinguish it from an input voltage applied to a reception VCO 833).

Figure 2:
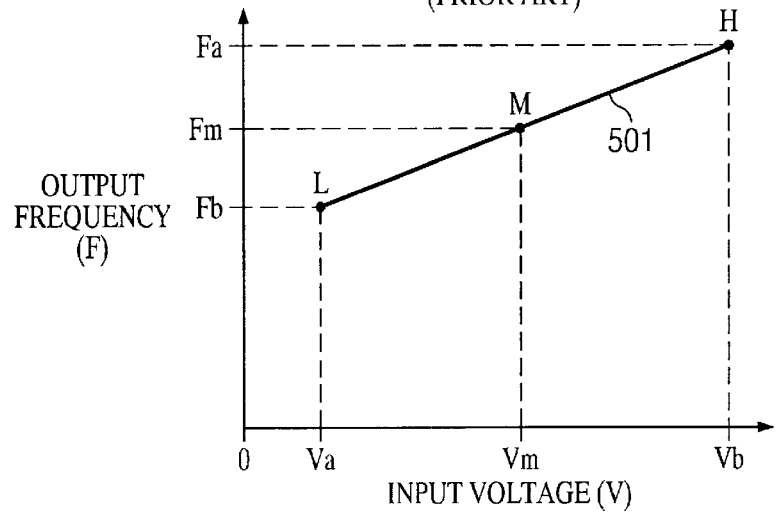
FIG. 2 shows a synchronous range of a VCO used in the PLL.

The initial voltage is a transmitter input voltage from which a synchronization frequency can be expected to be in the median band (point M in FIG. 2) of the receiver's synchronous range. In FIG. 2, for instance, such a voltage that a transmission clock frequency of the transmission VCO 44 is Fm is used as the transmitter input voltage. The initial voltage is preset based on the specification (voltage-frequency characteristic in an ideal state) of the reception VCO 833 at the time of shipment of the copier 1. Subsequently, whenever the synchronous setting is executed by the transmission CPU 42 at power-up of the copier 1, the initial voltage is renewed according to a transmitter input voltage obtained as a result of the synchronous setting.

The data modulating unit 43 transmits synchronization data according to a transmission clock signal generated from the transmission VCO 44 relative to the voltage applied by the transmission CPU 42. In response to this, the receiving unit 80 in the printing unit 50 executes PLL processing to have the reception VCO 833 generate a reception clock signal in sync with the transmission clock signal. Then, an input voltage (hereinafter "receiver input voltage") corresponding to a frequency of the reception clock signal is passed from the receiving unit 80 to the transmission CPU 42.

Figure 3:
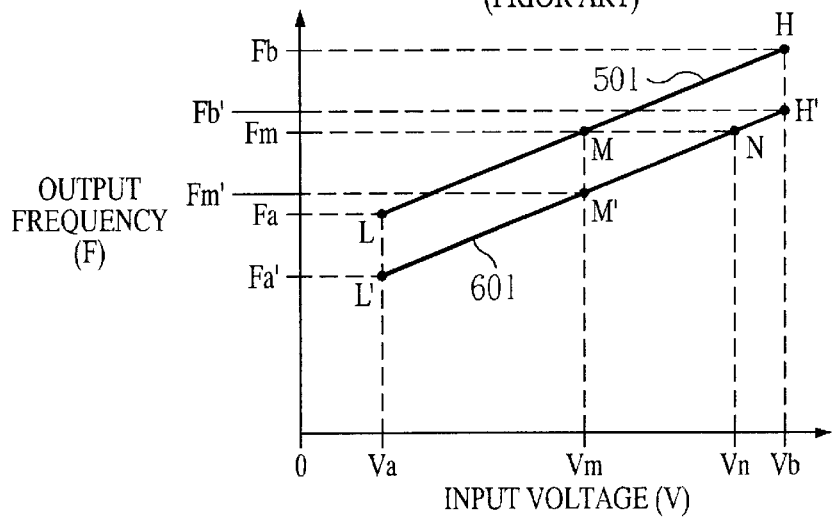
FIG. 3 shows synchronous ranges respectively prior and subsequent to a change in the characteristic of the VCO.

On receiving the receiver input voltage from the receiving unit 80, the transmission CPU 42 compares the receiver input voltage with a proper voltage stored in the transmitter ROM 46. This proper voltage is a voltage corresponding to the median frequency of the synchronous range of the reception VCO 833. In FIG. 2, for instance, the proper voltage is input voltage Vm at point M. If the characteristic of the reception VCO 833 is in the ideal state as indicated by solid line 501 in FIG. 2, the receiver input voltage will be Vm when the transmission VCO 44 generates a transmission clock signal of frequency Fm. However, if the synchronous range of the reception VCO 833 has deviated from the ideal state as in FIG. 3 due to changes in solid state and use environment of the reception VCO 833, the receiver input voltage sent to the transmission CPU 42 will be different from Vm. When this happens, the transmission CPU 42 changes the transmitter input voltage (transmission clock frequency) so that the receiver input voltage approximates to Vm, and instructs the receiving unit 80 to reexecute the PLL processing using the new transmission clock frequency.

When the receiver input voltage is above Vm, the transmission CPU 42 decreases the transmitter input voltage (transmission clock frequency), while when the receiver input voltage is below Vm, the transmission CPU 42 increases the transmitter input voltage. After the transmission clock frequency has been adjusted in such a way, the receiving unit 80 reexecutes the PLL processing using the new transmission clock frequency as a reference frequency, and notifies the receiver input voltage obtained as a result of the reexecution of the PLL processing to the transmission CPU 42. The transmission CPU 42 repeats the above process until the receiver input voltage becomes Vm, at which point in time the transmission CPU 42 notifies the receiving unit 80 of completion of the synchronous setting and stores the transmitter input voltage into the RAM 45 as the initial voltage. At the same time, the transmission CPU 42 instructs the data modulating unit 43 to stop transmitting synchronization data and so completes the operation for the synchronous setting.

Subsequently, when notified by the controlling unit 100 of execution of a copying operation, the transmission CPU 42 controls the data modulating unit 41 to transmit the serial data 90 in FIG. 6A to the receiving unit 80. The operation of the transmission CPU 42 for the synchronous adjustment is as follows.

The transmission CPU 42 acquires the initial voltage from the RAM 45 and applies the voltage to the transmission VCO 44 which accordingly generates a transmission clock signal. The transmission CPU 42 meanwhile instructs the data modulating unit 43 to transmit the synchronization data 91 according to the transmission clock signal. Then, on notification by the receiving unit 80 that the synchronization between the reception clock signal and the transmission clock signal has been completed, the transmission CPU 42 has the data modulating unit 43 stop sending the synchronization data 91. After this, whenever receiving a horizontal synchronizing signal from the controlling unit 100, the transmission CPU 42 instructs the data modulating unit 43 to transmit serial data of one frame.

The RAM 45 is a nonvolatile RAM where the initial voltage is stored.

The data modulating unit 43 transmits synchronization data alone to the receiving unit 80 under control of the transmission CPU 42 at power-up of the copier 1, until the synchronous setting is completed.

Also, at execution of a copying operation, the data modulating unit 43 transmits synchronization data to the receiving unit 80 for the synchronous adjustment under control of the transmission CPU 42, before transmitting image data of the first frame. Subsequently, whenever instructed by the transmission CPU 42 which receives a horizontal synchronizing signal, the data modulating unit 43 transmits serial data of a frame that follows to the receiving unit 80.

FIGS. 7A and 7B are timing charts showing the timing of data output of the data modulating unit 43.

FIG. 7A shows the data output timing in the synchronous setting. Once instructed by the transmission CPU 42 following power-up of the copier 1, the data modulating unit 43 commences transmission of synchronization data, and stops the transmission when notified of completion of the synchronous setting. After this, the data modulating unit 43 will not perform data transmission until the start of a copying operation.

FIG. 7B shows the data output timing in the synchronous adjustment. Once instructed by the transmission CPU 42 following the start of a copying operation, the data modulating unit 43 transmits serial data of one frame in response to each horizontal synchronizing signal 94. More specifically, the data modulating unit 43 commences transmission of synchronization data when notified of execution of a copying operation, and stops the transmission and starts transmitting start bit data and image data after notification of completion of the synchronous adjustment and subsequent reception of the horizontal synchronizing signal 94. After this, the data modulating unit 43 performs transmission of synchronization data for predetermined time followed by transmission of start bit data and image data, in response to each horizontal synchronizing signal. That is, the data modulating unit 43 continuously transmits synchronization data during a period from completion of image data transmission of one line up to reception of the next horizontal synchronizing signal. Here, the data modulating unit 43 does not actually receive the horizontal synchronizing signal, but receives the horizontal synchronizing signal in the form of an instruction for transmitting serial data of one line issued by the transmission CPU 42 that has received the horizontal synchronizing signal.

The transmission VCO 44 is an oscillator whose output frequency varies with an input voltage. A signal of a frequency corresponding to the transmitter input voltage applied via the D/A conversion terminal of the transmission CPU 42 is outputted from the transmission VCO 44 to the data modulating unit 43 as the transmission clock signal. The transmission VCO 44 commences the generation of the transmission clock signal at the start of the synchronous setting, and continues to do so until the copier 1 is powered down.

(4) Configuration of Receiving Unit 80

The configuration of the receiving unit 80 in the printing unit 50 that is the receiver in the image data transmission/reception processing is explained below with the operation of each component in the receiving unit 80.

The receiving unit 80 in the printing unit 50 performs data reception with the image reading unit 30. The receiving unit 80 is roughly made up of a reception CPU 81, a data demodulating unit 82, a phase comparator 831, an LPF 832, a reception VCO 833, a frequency divider 834, a timer unit 84, and a receiver ROM 85, as shown in FIG. 5.

The phase comparator 831, the LPF 832, the reception VCO 833, and the frequency divider 834 form a PLL unit 83. PLL processing performed by the PLL unit 83 is a well-known technique, so that its simplified explanation is given below.

Figure 1:
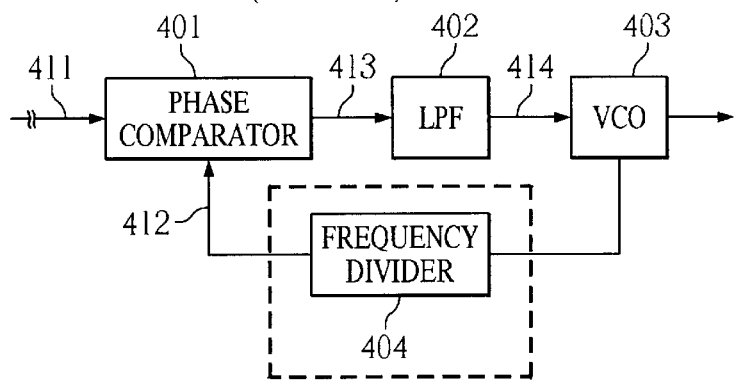
FIG. 1 is a block diagram showing the configuration of a PLL.

Synchronization data sent from the transmitting unit 40 according to the transmission clock signal is inputted into the data demodulating unit 82 as well as into the phase comparator 831 as a reference frequency used in the PLL unit 83. The phase comparator 831 compares a rising edge of the synchronization data 91 (corresponding to the reference frequency 411 in FIG. 1) and a rising edge of the reception clock signal (corresponding to the comparison frequency 412 in FIG. 1) and outputs a signal corresponding to a phase difference between them. The LPF 832 removes high frequency components from the signal and outputs the resulting direct current component to the reception VCO 833 and reception CPU 81.

The reception VCO 833 generates the reception clock signal of a frequency corresponding to a voltage of the signal outputted from the LPF 832. This reception clock signal is then outputted to the data demodulating unit 82 and frequency divider 834. The reception clock signal inputted in the frequency divider 834 is frequency divided and returned back to the phase comparator 831 as the signal of the comparison frequency. The reception clock signal inputted in the data demodulating unit 82 is ignored during synchronous processing, and is used for latching the image data 93 after the synchronous processing.

The frequency divider 834 frequency divides the reception clock signal by 2. Hence the transmission clock signal and the reception clock signal are synchronized in a state where the reception clock signal has double the frequency of the transmission clock signal (strictly speaking, this means "the transmission clock signal is synchronous with the signal produced by frequency dividing the reception clock signal by 2", though for simplicity the transmission clock signal will be described as being synchronous with the reception clock signal).

The execution/stop of PLL processing by the PLL unit 83 is controlled by a hold signal outputted from the data demodulating unit 82 to the phase comparator 831. When the hold signal is "0", the PLL unit 83 executes PLL processing, while when the hold signal is "1", the PLL unit 83 does not execute the PLL processing.

The hold signal is initially set to "0" when the data demodulating unit 82 is notified by the reception CPU 81 of power-up of the copier 1 (start of the synchronous setting). The hold signal is then switched to "1" when the data demodulating unit 82 is notified by the reception CPU 81 that the reception clock signal has been brought into sync with the transmission clock signal (completion of the synchronous setting) where the input voltage of the reception VCO 833 is Vm (at point M in FIG. 2).

In the subsequent execution of a copying operation, the hold signal is switched to "0" once the data demodulating unit 82 has been notified by the reception CPU 81 of the start of the copying operation. After this, the hold signal is switched from "0" to "1" each time data transmitted from the data modulating unit 43 changes from synchronization data to image data, and switched from "1" to "0" each time data transmitted from the data modulating unit 43 changes from image data to synchronization data. Lastly, after the copying operation is completed, during standby of waiting for the start of the next copying operation, the hold signal remains "1".

Once the hold signal has been switched to "1", the phase comparator 831 comes into a high impedance state, and the signal to be outputted to the LPF 832 is fixed to the output signal immediately before the hold signal was switched to "1". Accordingly, the voltage (receiver input voltage) of the direct current component outputted from the LPF 832 is kept constant, so that the frequency of the reception clock signal outputted from the reception VCO 833 is kept constant, too.

In reality, however, the receiver input voltage changes due to leakage currents occurring during a period where the hold signal is "1" (during standby or image data transmission/reception). Accordingly, the reception clock frequency fluctuates, and the reception clock signal generated from the reception VCO 833 which was once brought into sync with the transmission clock signal gradually deviates from the transmission clock signal. Such a deviation increases as the period during which the hold signal is "1" becomes longer, so that during standby of the copier 1 quite a large deviation emerges. This deviation is resolved by the synchronous adjustment performed when the next copying operation starts. Here, the smaller the deviation, the less time is required for the synchronous adjustment and as a result image data can be transmitted at high speed.

The reception CPU 81 controls the execution/stop of PLL processing according to instructions from the transmission CPU 42.

In the synchronous setting, the reception CPU 81 is notified of power-up of the copier 1 from the controlling unit 100 and accordingly instructs the data demodulating unit 82 to switch the hold signal to "0". Next, when notified by the transmission CPU 42 that the synchronous setting has been completed at an appropriate frequency (point M in FIG. 2), the reception CPU 81 instructs the data demodulating unit 82 to switch the hold signal to "1".

In the synchronous adjustment, the reception CPU 81 is notified of execution of a copying operation from the controlling unit 100 and accordingly instructs the data demodulating unit 82 to switch the hold signal to "0". The subsequent switching of the hold signal is made based on a horizontal synchronizing signal sent from the controlling unit 100 and a type of data (synchronization data or image data) sent from the transmitting unit 40 to the data demodulating unit 82. The data demodulating unit 82 switches the hold signal to "1" each time data from the transmitting unit 40 changes from synchronization data to image data, and switches the hold signal to "0" each time a horizontal synchronizing signal is sent from the controlling unit 100. In the present embodiment, the data demodulating unit 82 receives each horizontal synchronizing signal via the reception CPU 81.

Figure 8A:
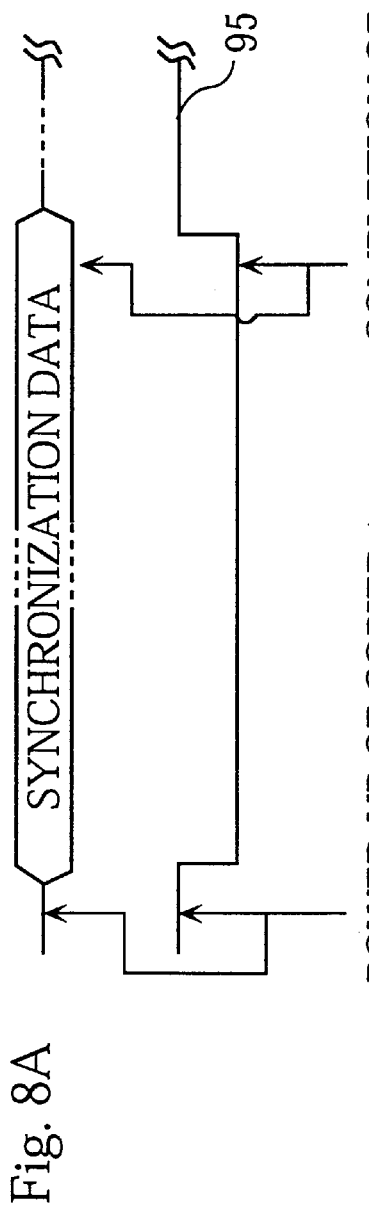
FIGS. 8A and 8B are timing charts which each show the relation between serial data and a hold signal for controlling PLL processing of the receiving unit.
Figure 8B:
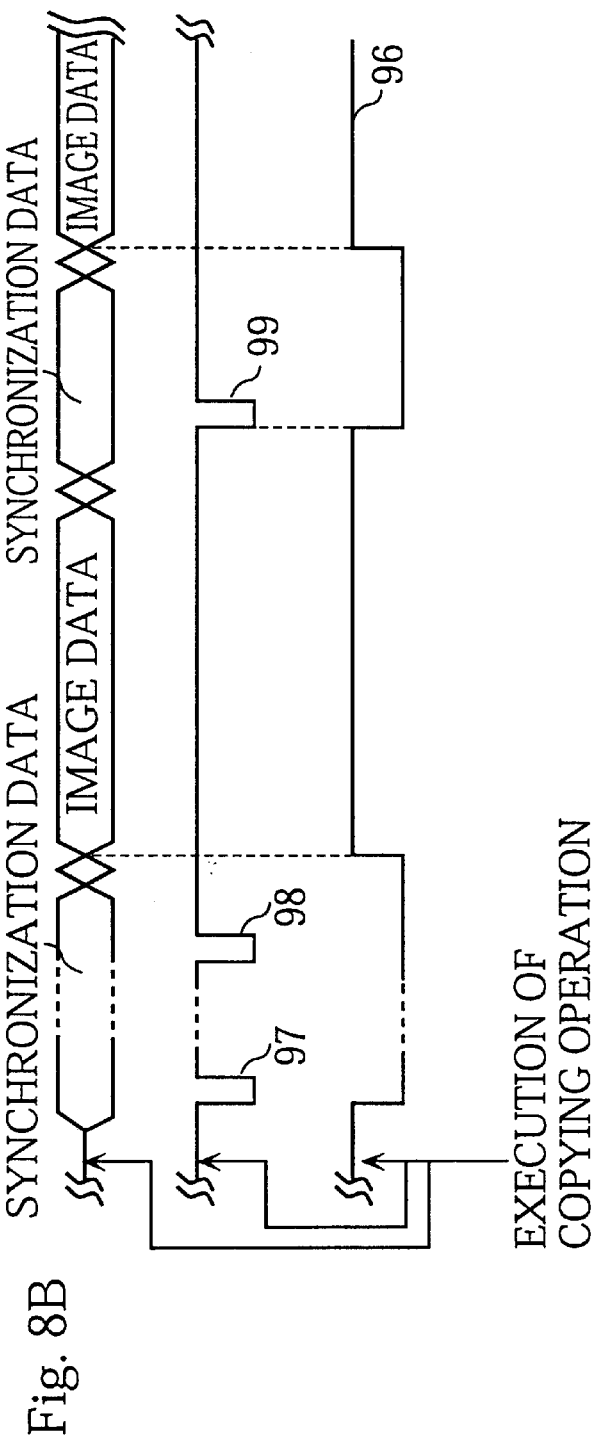

FIGS. 8A and 8B show the relation between the hold signal and the type of data transmitted from the image reading unit 30 to the printing unit 50.

FIG. 8A shows the relation between the hold signal and the transmitted data in the synchronous setting. A hold signal 95 is switched to "0" after the data demodulating unit 82 is notified by the reception CPU 81 of power-up of the copier 1, and is switched to "1" after the data demodulating unit 82 is notified by the reception CPU 81 of completion of the synchronous setting. Between these switches only synchronization data is sent from the data modulating unit 43.

FIG. 8B shows the relation between the hold signal and the transmitted data in the synchronous adjustment. A hold signal 96 is switched to "0" in response to a horizontal synchronizing signal 97 received immediately after the reception CPU 81 is notified by the controlling unit 100 of execution of a copying operation. At around the same time, the data modulating unit 43 starts sending synchronization data. After this, the hold signal 96 is switched based on the type of data (synchronization data or image data) transmitted from the data modulating unit 43 as well as horizontal synchronizing signals 98 and 99.

The direct current component (receiver input voltage) outputted from the LPF 832 into the reception CPU 81 is revealed to the transmission CPU 42 in the synchronous setting. The timing of revealing the receiver input voltage to the transmission CPU 42 is controlled by the timer unit 84. Although the direct current component is successively outputted from the LPF 832 into the reception CPU 81, only a receiver input voltage obtained as a result of execution of PLL processing needs to be notified to the transmission CPU 42 in the synchronous setting. Accordingly, the reception CPU 81 sets time sufficient for executing the PLL processing into the timer unit 84 so that the receiver input voltage will be notified to the transmission CPU 42 only when the time set in the timer unit 84 has elapsed (when the execution of the PLL processing is considered to be complete). The timer unit 84 is activated by the reception CPU 81 each time a horizontal synchronizing signal is received and each time the transmission CPU 42 instructs the reception CPU 81 to reexecute PLL processing.

On the other hand, in execution of a copying operation (in synchronous adjustment), based on the phase difference signal for the transmission clock signal and reception clock signal received from the phase comparator 831, the reception CPU 81 judges whether the synchronous adjustment has been completed (whether the phase difference has been resolved). On judging that the synchronous adjustment has been complete, the reception CPU 81 notifies the transmission CPU 42 of completion of the synchronous adjustment.

The timer unit 84 includes a dedicated clock oscillator and counts the time set by the reception CPU 42. Once the set time has elapsed, the timer unit 84 notifies the reception CPU 81 of the timeout.

In addition to the switching of the hold signal noted above, the data demodulating unit 82 also performs processes of latching and demodulating image data included in serial data received from the image reading unit 30 according to the reception clock signal outputted from the reception VCO 833 and outputting the image data to a D/A converting unit (not illustrated). Here, the data demodulating unit 82 distinguishes synchronization data and image data by start bit data.

(5) Transmit Operation of Transmitting Unit 40

In the synchronous setting, the transmitting unit 40 operates as follows.

Figure 9:
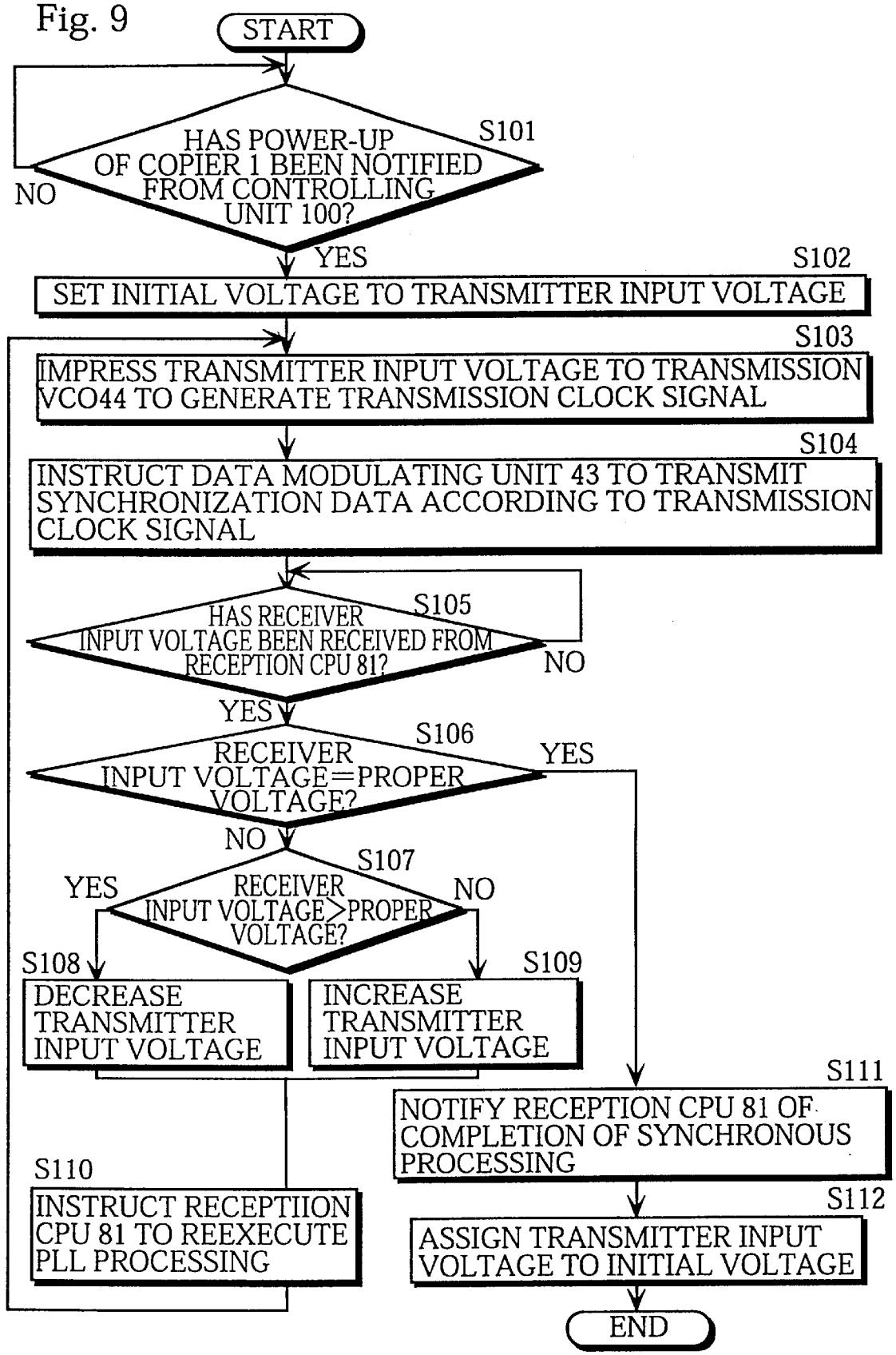
FIG. 9 is a flowchart showing the operation of the transmitting unit in synchronous processing.

FIG. 9 is a flowchart showing the operation of the transmitting unit 40 in the synchronous setting, with emphasis on the transmission CPU 42.

The transmission CPU 42 waits for notification by the controlling unit 100 that the copier 1 has been powered up by the user (S101). On notification of power-up of the copier 1, the transmission CPU 42 reads an initial voltage from the RAM 45 (S102) and applies the initial voltage to the transmission VCO 44 as a transmitter input voltage so that a transmission clock signal is generated (S103).

The transmission CPU 42 then instructs the data modulating unit 43 to transmit synchronization data to the printing unit 50 according to the transmission clock signal (S104).

After this, the transmission CPU 42 waits for receiving a receiver input voltage from the reception CPU 81 (S105). On receiving the receiver input voltage, the transmission CPU 42 compares the receiver input voltage with a proper voltage stored in the transmitter ROM 46 (S106). If they do not match, the transmission CPU 42 adjusts the transmitter input voltage with respect to the difference between the receiver input voltage and the proper voltage. Here, if the receiver input voltage is higher than the proper voltage (S107), the transmitter input voltage is decreased (S108), while if the receiver input voltage is lower than the proper voltage, the transmitter input voltage is increased (S109). The transmission CPU 42 then applies the new transmitter input voltage to the transmission VCO 44 so that a transmission clock signal of a frequency different from the preceding transmission clock signal is generated (S103). The transmission CPU 42 also instructs the reception CPU 81 to reexecute PLL processing with the new transmission clock signal (S110). The transmission CPU 42 repeats steps S103~S110 until the receiver input voltage matches the proper voltage.

When the receiver input voltage matches the proper voltage, the transmission CPU 42 notifies completion of the synchronous setting to the reception CPU 81 which accordingly ends the PLL processing, and also instructs the data modulating unit 43 to stop transmitting synchronization data (S111). The transmission CPU 42 then changes the initial value in the RAM 45 to the transmitter input voltage obtained at the time of the completion of the synchronous setting (S112).

(6) Receive Operation of Receiving Unit 80

On the other hand, the receiving unit 80 operates in the synchronous setting as follows.

Figure 10:
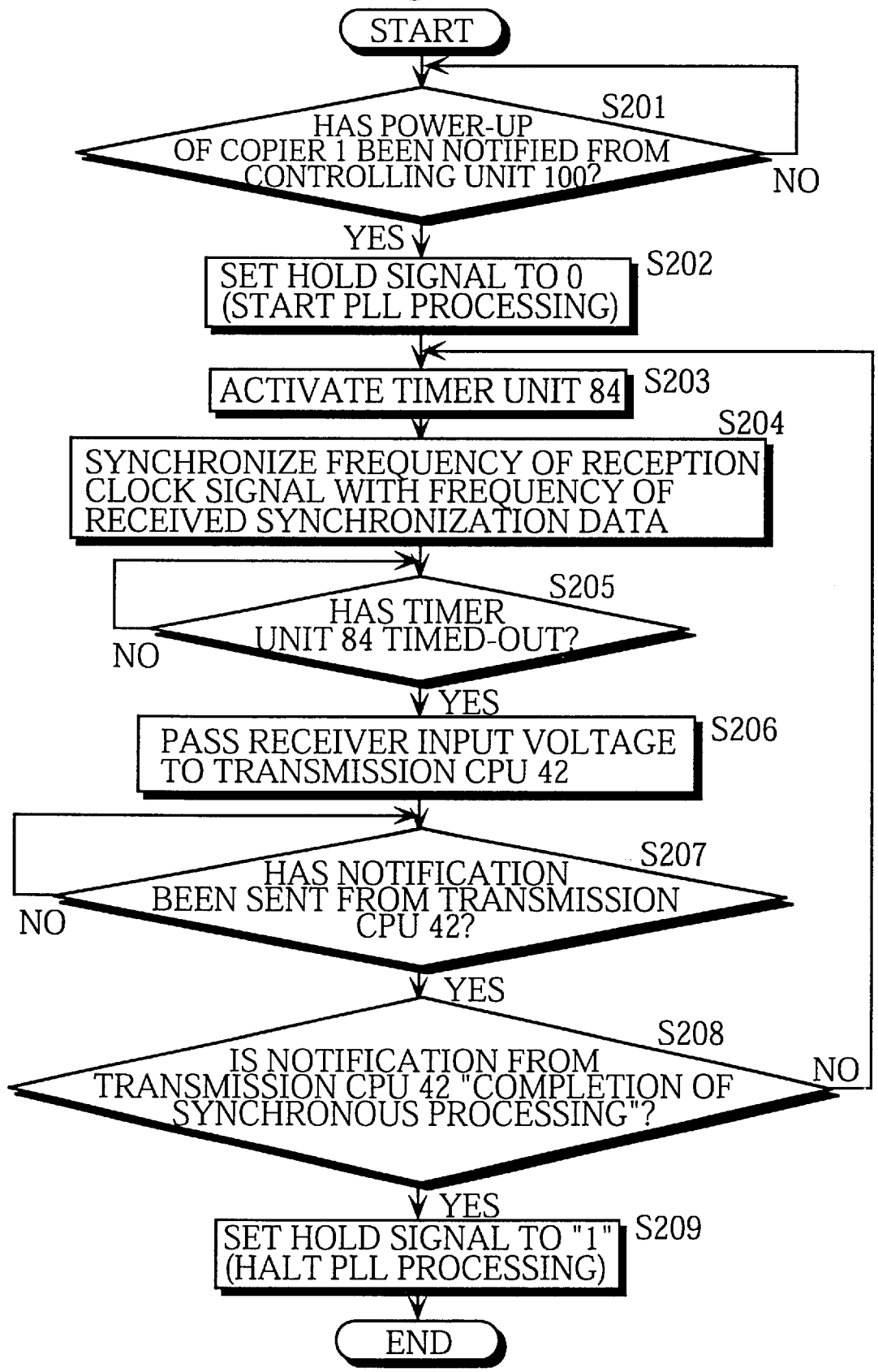
FIG. 10 is a flowchart showing the operation of the receiving unit in the synchronous processing.

FIG. 10 is a flowchart showing the operation of the receiving unit 80 in the synchronous setting, with emphasis on the reception CPU 81.

The reception CPU 81 waits for being notified by the controlling unit 100 that the copier 1 has been powered up by the user (S201). On notified of power-up of the copier 1, the reception CPU 81 has the data demodulating unit 82 switch the hold signal to "0" (S202) and activates the timer unit 84 (S203).

Subsequently, on receiving synchronization data from the transmitting unit 40, the PLL unit 83 performs PLL processing using a frequency of the synchronization data as a reference frequency to synchronize the frequencies of the transmission clock signal and the reception clock signal (S204). Meanwhile, the reception CPU 81 waits for the execution of the PLL processing to complete (timeout of the timer unit 84) (S205).

Once the PLL processing has been executed, the reception CPU 81 reads a voltage (receiver input voltage) of a direct current component from the LPF 832 and notifies the receiver input voltage to the transmission CPU 42 (S206). The reception CPU 81 then waits for a response from the transmission CPU 42 (S207).

If the transmission CPU 42 responds by notifying completion of the synchronous processing (i.e. the receiver input voltage and the proper voltage being equal) (S208), the reception CPU 81 instructs the data demodulating unit 82 to switch the hold signal to "1" to halt the PLL processing (S209). If, on the other hand, the transmission CPU 42 responds by indicating reexecution of the PLL processing (i.e. the receiver input voltage and the proper voltage not being equal), the reception CPU 81 repeats steps S203~S207.

Thus, in the present embodiment the transmission CPU 42 adjusts the transmitter input voltage to set the synchronization frequency at the center of the synchronous range of the reception VCO 833, based on the receiver input voltage received from the reception CPU 81 in the synchronous setting. Accordingly, the time taken for the subsequent synchronous adjustment performed at the time of execution of a copying operation can be reduced, with it being possible to improve the data transfer efficiency.

While in the above embodiment the reception CPU 81 has passed the receiver input voltage to the transmission CPU 42, the reception CPU 81 may instead pass any information with which the transmission CPU 42 can judge whether the receiver input voltage matches the proper voltage. Suppose the reception CPU 81 holds the proper voltage. Then the reception CPU 81 may notify the transmission CPU 42 of the difference between the receiver input voltage and the proper voltage, or alternatively compare the receiver input voltage with the proper voltage and instruct the transmission CPU 42 to change (increase or decrease) the transmitter input voltage based on the comparison result.

While in the above embodiment the synchronous setting and the synchronous adjustment have respectively been performed at power-up of the copier 1 and prior to scanning of the first line in each copying operation, the timings of executing the synchronous setting and synchronous adjustment are not limited to such. The synchronous setting may instead be performed at constant time intervals after power-up of the copier 1. For the synchronous adjustment, since it aims to adjust a deviation occurring during standby of the PLL unit 83 (while the hold signal is "1"), standby time of the PLL unit may be measured so that the synchronous adjustment is performed when the standby time exceeds predetermined time.

Although the above embodiment has taken a digital copier as an example, the present invention can be applied to any apparatus that performs synchronization data transmission/reception using a PLL.

Second Embodiment (1) General Configuration of Copier

Figure 11:
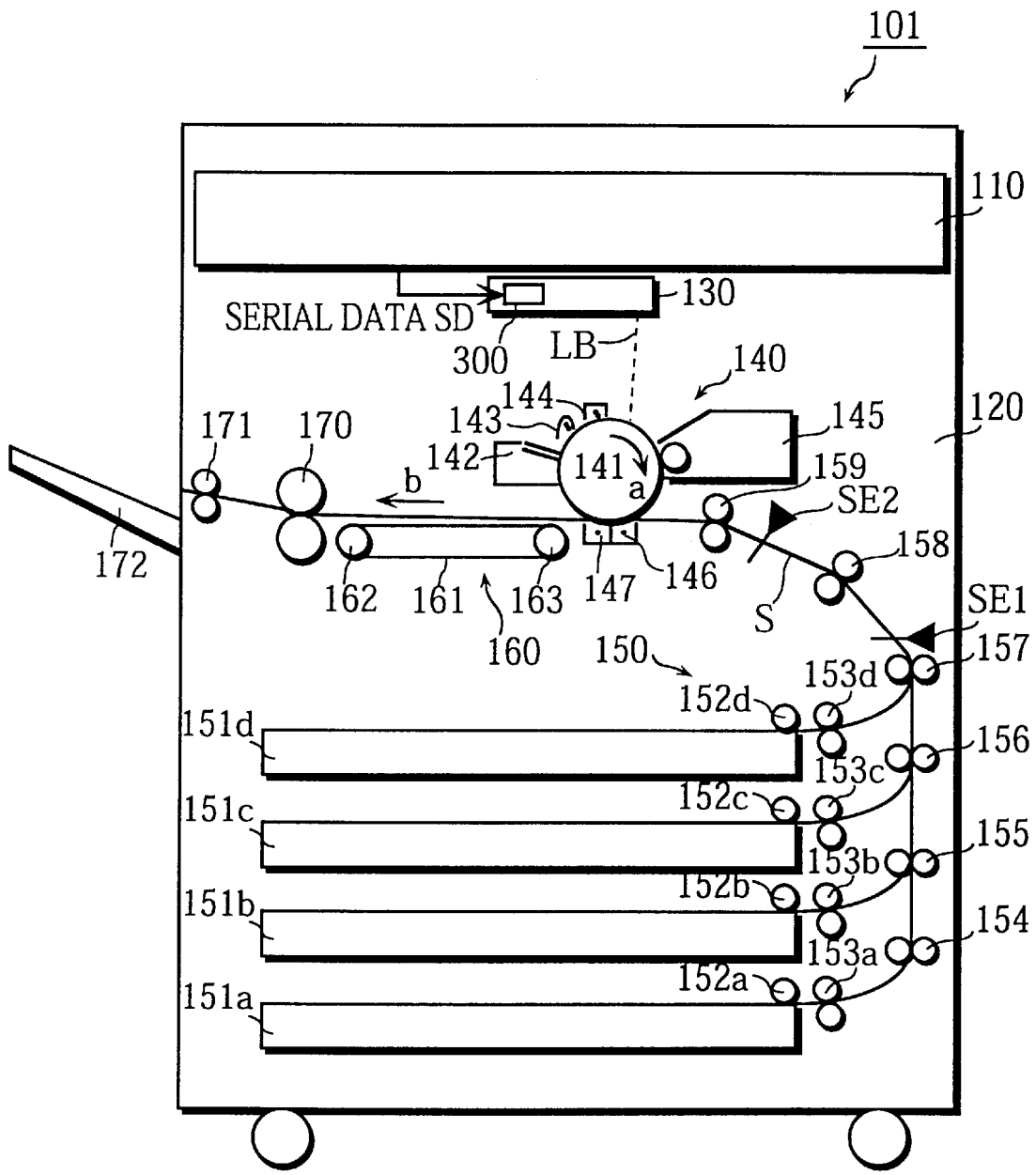
FIG. 11 shows the general configuration of a copier provided with a data reception device of the second embodiment of the present invention.

FIG. 11 shows the general configuration of a copier 101 that is provided with a data reception device of the second embodiment of the present invention.

This copier 101 is roughly made up of an image reading unit 110 for reading an image from a document and a printing unit 120 for printing the read image onto recording sheet S such as an OHP (OverHead Projector) sheet to reproduce the image.

The image reading unit 110 scans an image of a document placed on a platen glass in units of lines, converts the scanned image into electric signals using a CCD image sensor or the like, and analog-to-digital converts the electric signals to gradation data (e.g. 8-bit gradation data), according to a well-known technique. Once the gradation data has been stored into an image memory (not illustrated), the gradation data is read from the image memory in units of lines as necessary, parallel-to-serial converted in units of pixels, and transmitted in an asynchronous serial fashion to a data reception device 300 in the printing unit 120 in sync with a clock signal (transmission clock signal) of a predetermined frequency. The transmitted data is then used as a driving signal of an LD (not illustrated) in the printing unit 120.

The printing unit 120 forms an image on recording sheet S using a well-known electrophotographic method. The printing unit 120 is equipped with the data reception device 300 and the LD and includes a scanning unit 130 for emitting laser beam LB by the driving signal, an image forming unit 140, a paper supplying unit 150, a sheet transporting unit 160, and a fixing unit 170.

The image forming unit 140 includes a photosensitive drum 141 surrounded by a cleaner 142, an eraser lump 143, a sensitizing charger 144, a developer 145, a transfer charger 146, and a separation charger 147. The photosensitive drum 141 is rotated at a predetermined system speed in the direction indicated by arrow a, by a drive motor (not shown in the figure).

The paper supplying unit 150 includes multiple paper cassettes (four cassettes in this embodiment) 151*a*~151*d* that each accommodate a stack of recording sheets of a predetermined size, feeding rollers 152*a*~152*d* for feeding recording sheet S from one of the respective paper cassettes 151*a*~151*d*, handling rollers 153*a*~153*d* for handling recording sheet S, a timing roller 159 for timing transport of recording sheet S to a transfer position between the photosensitive drum 141 and the transfer charger 146, vertical transport rollers 154~158 for transporting recording sheet S from the handling rollers 153*a*~153*d* to the timing roller 159, and sensors SE1 and SE2 for detecting a paper jam and the like. Recording sheet S is temporarily stopped at the timing roller 159 and is transported to the transfer position at the system speed in sync with the image forming operation of the photosensitive drum 141.

The sheet transporting unit 160 transports recording sheet S from the transfer position to the fixing unit 170 and includes an endless sheet transport belt 161 and a pair of rollers (drive roller 162 and follower roller 163) over which the sheet transport belt 161 is looped and rotated in the direction shown by arrow b at the system speed in sync with the photosensitive drum 141.

Before laser beam LB scans the surface of the photosensitive drum 141, the cleaner 142 removes remaining toner particles from the surface of the photosensitive drum 141. Also, the eraser lamp 143 neutralizes any surface potential remaining on the surface of the photosensitive drum 141.

The surface of the photosensitive drum 141 is then uniformly charged by the sensitizing charger 144. In this charged state, laser beam LB scans the surface of the photosensitive drum 141, so that an electrostatic latent image is formed on the surface of the photosensitive drum 141. This electrostatic latent image is then developed by the developer 145 into a visible toner image. In the meantime, recording sheet S is supplied from the paper supplying unit 150 to the transfer position at the bottom of the photosensitive drum 141 in sync with the image forming operation. By means of electricity of the transfer charger 146, the toner image formed on the surface of the photosensitive drum 141 is transferred onto recording sheet S.

Recording sheet S is then separated from the photosensitive drum 141 by the separation charger 147 neutralizing electrical charges on recording sheet S, and is transported to the fixing unit 170 by the sheet transporting unit 160 at the system speed. After the toner particles are fixed into place on recording sheet S by the application of heat from the fixing unit 170, recording sheet S is discharged onto a discharge tray 172 by a discharge roller 171 and hence the image is reproduced based on the gradation data obtained from the document.

Figure 12:
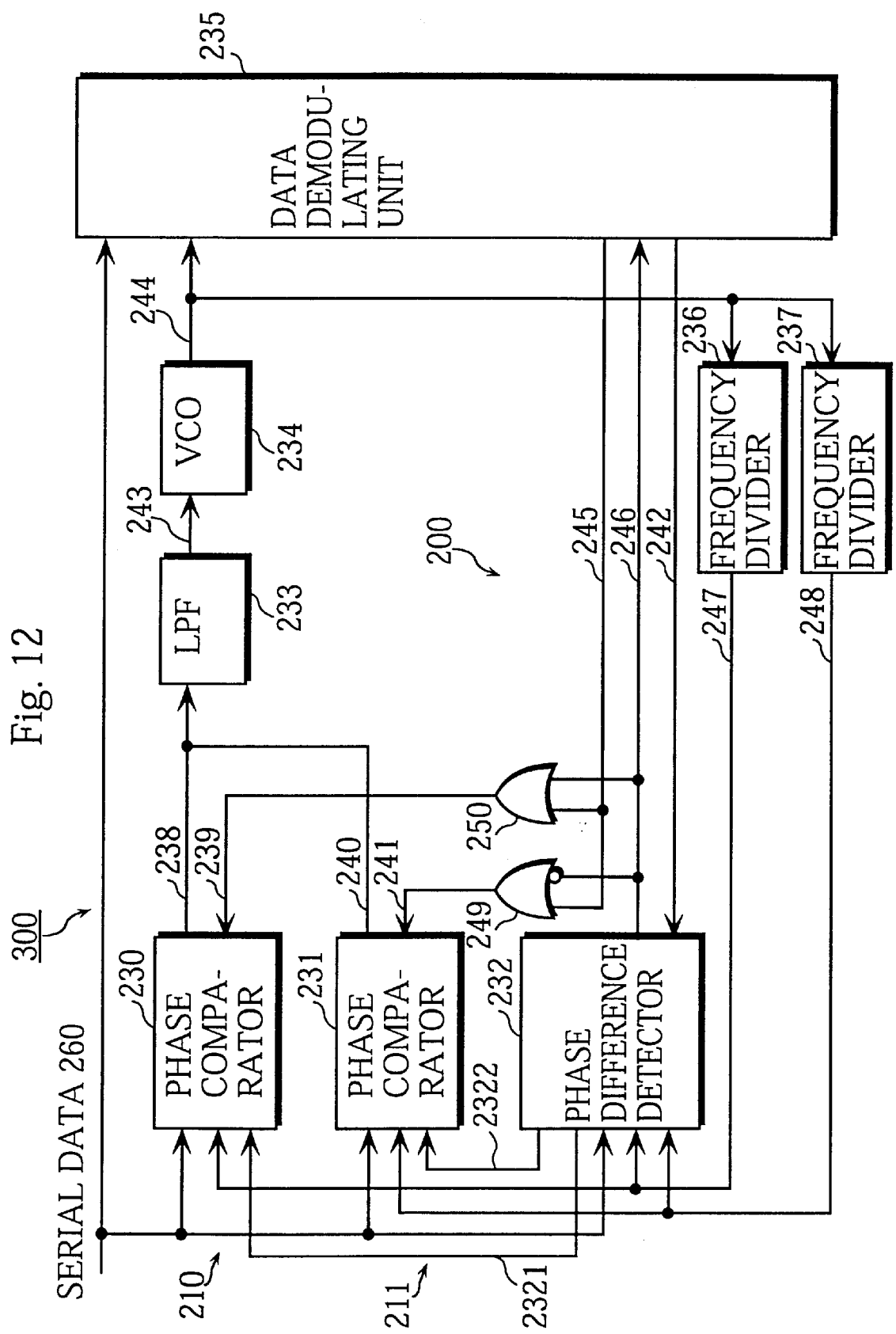
FIG. 12 is a block diagram showing the configuration of the data reception device of the second embodiment.
Figure 13:
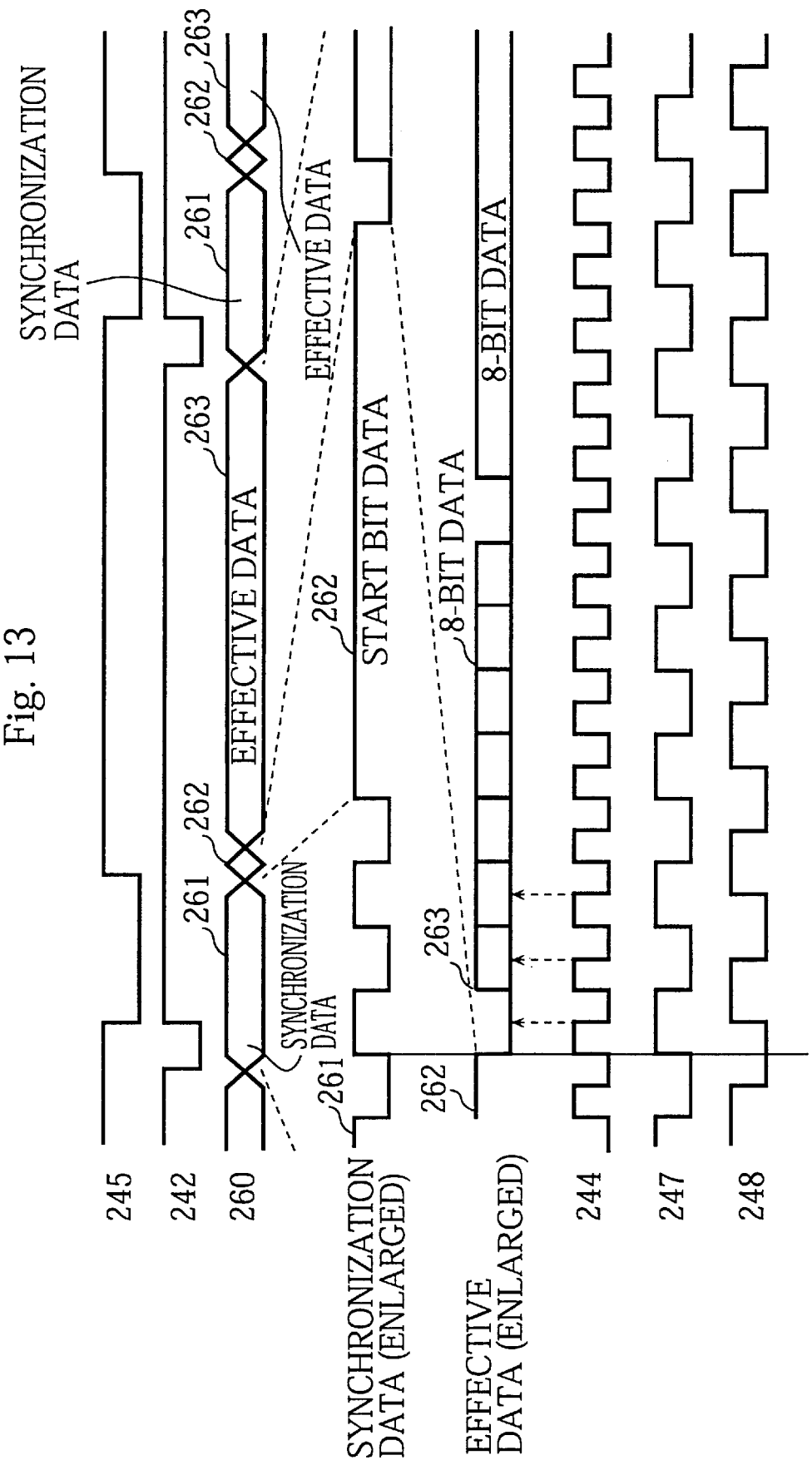
FIG. 13 shows the structure of serial data transmitted from an image reading unit to the data reception device.

FIG. 12 is a block diagram showing the configuration of the data reception device 300, whereas FIG. 13 shows the structure of serial data 260 transmitted from the image reading unit 110 to the data reception device 300.

In FIG. 12, the data reception device 300 is roughly made up of a PLL unit 200 and a data demodulating unit 235. In FIG. 13, the serial data 260 is composed of a plurality of consecutive frames that each include synchronization data 261 alternating between "0" and "1" bit-by-bit, 9-bit start bit data 262 showing "1", and effective data 263 made up of a plurality of consecutive 9-bit strings where 8-bit textual or image information follows a bit showing "0".

The data demodulating unit 235 samples the effective data 263 according to a reception clock signal 244 generated by the PLL unit 200.

The PLL unit 200 generates the reception clock signal 244 based on the synchronization data 261 sent from the image reading unit 110 in units of frames and outputs the reception clock signal 244 to the data demodulating unit 235. To reduce the time conventionally required for generating the reception clock signal 244, the PLL unit 200 selectively switches between two PLL circuits that are a first PLL circuit 210 equipped with a phase comparator 230, an LPF 233, a VCO 234 and a frequency divider 236 and a second PLL circuit 211 equipped with a phase comparator 231, the LPF 233, the VCO 234, and a frequency divider 237 (the LPF 233 and the VCO 234 are shared in the two circuits). The configuration of this PLL unit 200 is described below.

The VCO 234 is a well-known voltage controlled oscillator whose output frequency varies with an applied voltage. The VCO 234 generates the reception clock signal 244 corresponding to an output voltage of the LPF 233 and outputs the reception clock signal 244 to the data demodulating unit 235 and frequency dividers 236 and 237.

Figure 14:
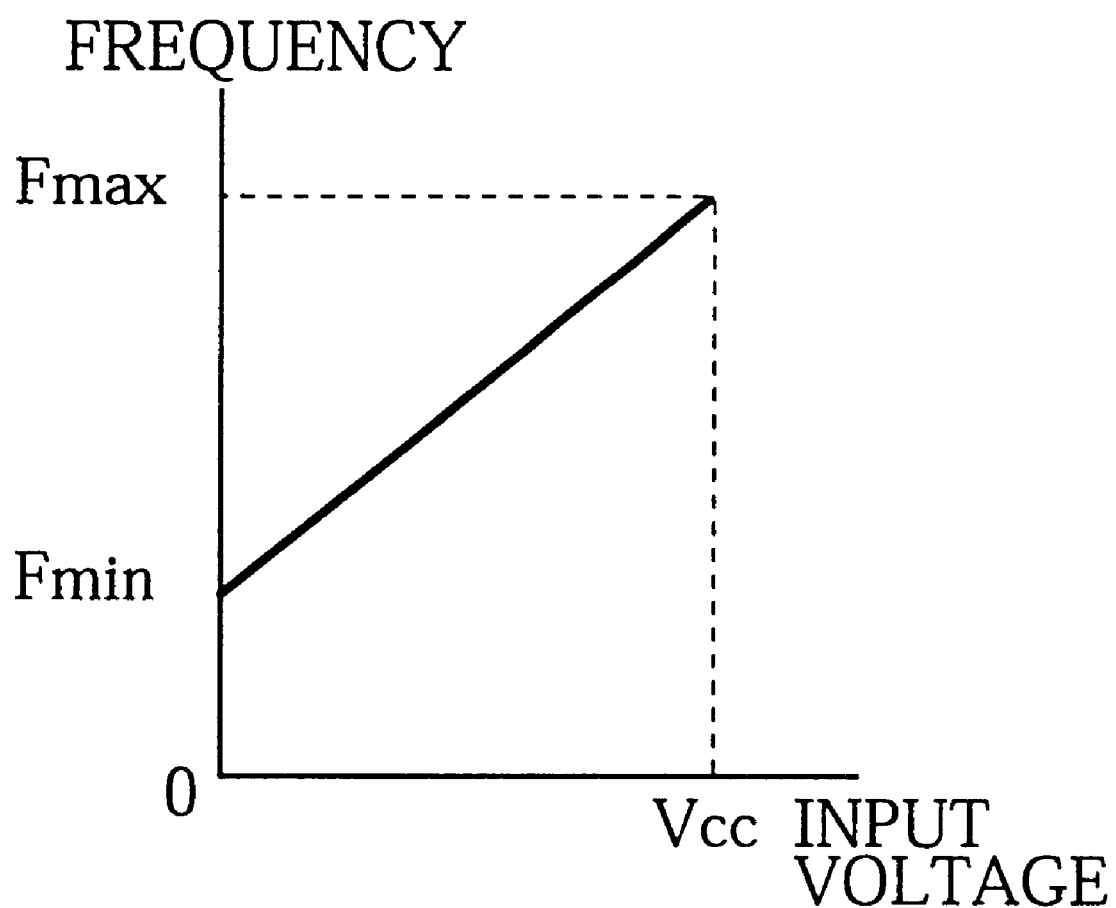
FIG. 14 shows the frequency characteristic of a reception clock signal with respect to an input voltage of a VCO used in the data reception device.

FIG. 14 shows the frequency characteristic of the reception clock signal 244 relative to an input voltage of the VCO 234. As is evident from the figure, the VCO 234 has a property that its output frequency linearly increases with increase in the input voltage. Since the transfer rate (frequency) of the serial data 260 is constant, a crystal oscillator with high stability and low variation is used in this VCO 234.

In FIG. 12, the frequency divider 236 is made up of a flip-flop that is triggered on a rising edge of the reception clock signal 244 generated by the VCO 234. The frequency divider 236 frequency divides the reception clock signal 244 by 2 to generate a frequency-divided clock signal 247 (see FIG. 13) and outputs the frequency-divided clock signal 247 to the phase comparator 230 and phase difference detector 232.

The frequency divider 237 is made up of a flip-flop that is triggered on a falling edge of the reception clock signal 244. The frequency divider 237 frequency divides the reception clock signal 244 by 2 to generate a frequency-divided clock signal 248 (see FIG. 13) and outputs the frequency-divided clock signal 248 to the phase comparator 231 and phase difference detector 232. The frequency-divided clock signal 248 lags 90° behind the frequency-divided clock signal 247, because the frequency divider 237 is triggered on a falling edge of the reception clock signal 244.

The phase comparator 230 generates a phase difference signal 238 corresponding to a phase difference between the received synchronization data 261 and the frequency-divided clock signal 247 and outputs the phase difference signal 238 to the LPF 233.

Since the phase comparator 230 is made up of a charge pump circuit, if there is no phase difference the phase comparator 230 goes into a high impedance state in an output terminal thereof and as a result does not pass a current to the LPF 233. Note that the phase comparator 230 operates only when an output terminal of a phase comparator selecting unit 250 is "0", and does not operate but goes into a high impedance state in its output terminal when the output terminal of the phase comparator selecting unit 250 is "1".

Figure 15A:
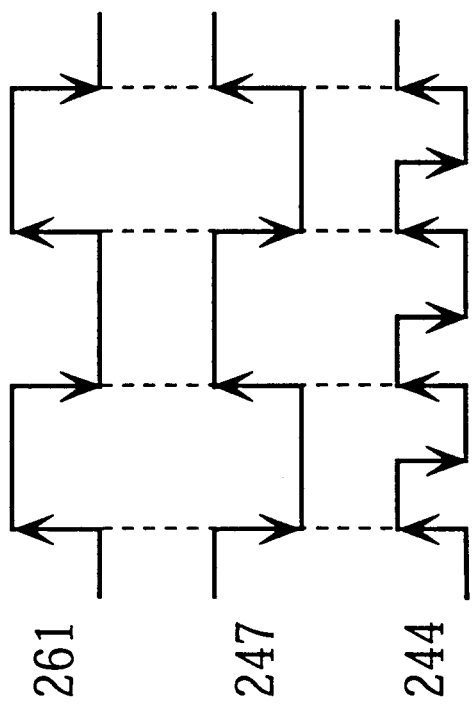
FIG. 15A shows a state where synchronization data and a frequency-divided clock signal are in sync with each other at their same-directional edges (i.e. rising edges (falling edges) of the synchronization data being in sync with rising edges (falling edges) of the frequency-divided clock signal)
Figure 15B:
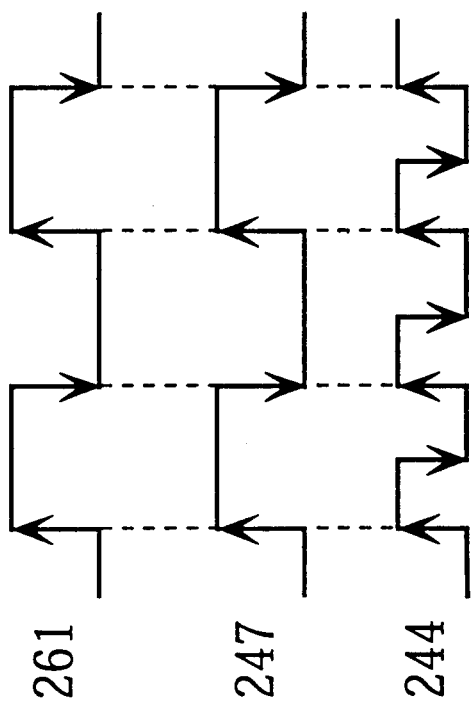
FIG. 15B shows a state where the synchronization data and the frequency-divided clock signal are in sync with each other at their opposite-directional edges (i.e. rising edges (falling edges) of the synchronization data being in sync with falling edges (rising/edges) of the frequency-divided clock signal)

The phase comparator 230 also receives a lock signal 2321. When the lock signal 2321 shows "0", the phase comparator 230 operates to synchronize the synchronization data 261 and the frequency-divided clock signal 247 at their same-directional edges (i.e. synchronize the rising edges (or falling edges) of the synchronization data 261 and the frequency-divided clock signal 247) (see FIG. 15A). When the lock signal 2321 shows "1", on the other hand, the phase comparator 230 operates to synchronize the synchronization data 261 and the frequency-divided clock signal 247 on their opposite-directional edges (i.e. synchronize the rising edges of the synchronization data 261 and the falling edges of the frequency-divided clock signal 247, and vice versa) (see FIG. 15B). In the present embodiment the term "phase equalization" refers to synchronizing the same-directional edges or opposite-directional edges of the two signal to bring the two signals into the state shown by FIG. 15A or 15B. It should be noted here that regardless of whether synchronous with each other on the same-directional edges or on the opposite-directional edges, the synchronization data 261 and the reception clock signal 244 are synchronous on their rising edges. This is because the frequency-divided clock signal 247 is a signal generated by frequency dividing the reception clock signal 244 on its rising edge. The circuit construction of the phase comparator 230 will be described in detail later.

The phase comparator 231 has the same construction as the phase comparator 230. The phase comparator 231 generates a phase difference signal 240 corresponding to a phase difference between the received synchronization data 261 and the frequency-divided clock signal 248 and outputs the phase difference signal 240 to the LPF 233. The phase comparator 231 operates only when an output terminal of a phase comparator selecting unit 249 is "0", and does not operate but sets its output terminal into a high impedance state when the output terminal of the phase comparator selecting unit 249 is "1".

The phase comparator 231 also receives a lock signal 2322. When the lock signal 2322 shows "0", the phase comparator 231 operates to synchronize the same-directional edges of the synchronization data 261 and the frequency-divided clock signal 248, while when the lock signal 2322 shows "1", the phase comparator 231 operates to synchronize the opposite-directional edges of the synchronization data 261 and the frequency-divided clock signal 248, in the same way as the phase comparator 230.

The LPF 233 is a well-known lowpass filter made up of a resister and a capacitor. On receiving either the phase difference signal 238 or the phase difference signal 240, the LPF 233 removes high frequency components and noise components from the received signal, smooths the signal into a direct voltage, and outputs the direct voltage to the VCO 234.

Each of the phase comparator selecting units 249 and 250 is composed of an OR gate and receives a phase difference signal 246 and a hold signal 245 respectively from the phase difference detector 232 and the data demodulating unit 235.

The phase difference detector 232 detects phase differences between the synchronization data 261 and the frequency-divided clock signal 247 and between the synchronization data 261 and the frequency-divided clock signal 248 and outputs the phase difference signal 246 and the lock signals 2321 and 2322 according to the detected phase differences.

Suppose the hold signal 245 outputted from the data demodulating unit 235 is "0". If the phase difference signal 246 is "0", the output terminal of the phase comparator selecting unit 250 becomes "0", thereby triggering the first PLL circuit 210. If, on the other hand, the phase difference signal 246 is "1", the output terminal of the phase comparator selecting unit 249 becomes "0", thereby triggering the second PLL circuit 211. Also, if the lock signal 2321 is "0", the synchronization data 261 and the frequency-divided clock signal 247 are synchronized at their same-directional edges in the phase comparator 230, while if the lock signal 2321 is "1", the two signals are synchronized at their opposite-directional edges in the phase comparator 230. Similarly, when the lock signal 2322 is "0", the two signals are synchronized at their same-directional edges in the phase comparator 231, while when the lock signal 2322 is "1", the two signals are synchronized at their opposite-directional edges in the phase comparator 231. The circuit construction of the phase difference detector 232 will be detailed later.

On receiving the synchronization data 261 included in the serial data 260, the data demodulating unit 235 outputs an enable signal 242 (see FIG. 13) that remains "0" for a fixed period to the phase difference detector 232. When the enable signal 242 is "0", the phase difference detector 232 sets an output level of each of the phase difference signal 246 and lock signals 2321 and 2322 to "1" or "0" depending on the detected phase differences, as described later. Since the hold signal 245 is "1" while the enable signal 242 is "0" (see FIG. 13), the output terminals of the phase comparator selecting unit 249 and 250 are both "1", so that the phase comparators 230 and 231 are in a stopped state during this period.

The data demodulating unit 235 then switches the enable signal 242 from "0" to "1" and concurrently sets the hold signal 245 to "0" (FIG. 13). As a result, the phase comparator 230 or 231 is activated depending on the output level of the phase difference signal 246 to form the first PLL circuit 210 or the second PLL circuit 211. Then phase equalization is performed according to the output level of the lock signal 2321 or 2322.

The data demodulating unit 235 counts the number of pulses of the received synchronization data 261. When the count number of pulses reaches a predetermined number, the data demodulating unit 235 switches the hold signal 245 from "0" to "1". This switching is easy if the transmission time (the number of pulses) of the synchronization data 261 has been set in advance. Once the hold signal 245 has become "1", the output terminals of the phase comparator selecting units 249 and 250 become "1". Accordingly, the output terminals of the phase comparators 230 and 231 go into a high impedance state and the PLL control halts. During this halt the capacitor in the LPF 233 remains charged, so that the reception clock signal 244 is fixed at a frequency immediately before the halt of the PLL control.

The data demodulating unit 235 uses this reception clock signal 244 to sample the start bit data 262 and the effective data 263. The start bit data 262 is a 9-bit signal showing "1" and is inserted between the synchronization data 261 and the effective data 263. With this data structure, the data reception device 300 can distinguish the synchronization data 261 from the effective data 263. Also, since the effective data 263 is made up of 9-bit data strings which each include 8-bit textual or image information following a bit showing "0", the data reception device 300 can recognize 8-bit data following a bit showing "0" as textual or image information. Once the effective data 263 has been completely received and the image reading unit 110 has started sending the synchronization data 261 of the next frame, the data demodulating unit 235 changes the enable signal 242 from "1" to "0". Subsequently, the above operation is repeated until the effective data 263 of every frame is sampled.

Figure 16:
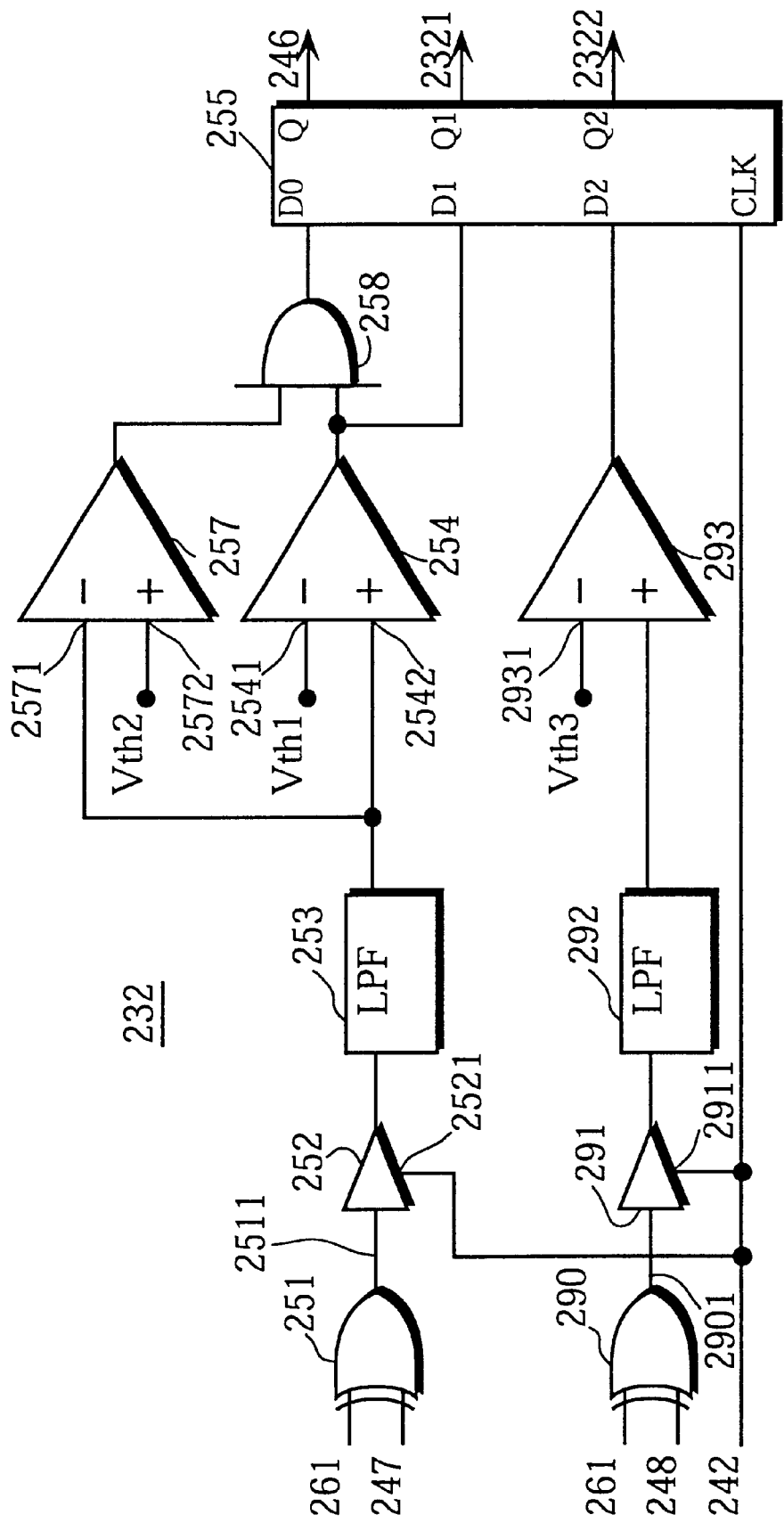
FIG. 16 shows the circuit construction of a phase difference detector in the data reception device.

FIG. 16 shows the circuit construction of the phase difference detector 232.

The phase difference detector 232 is mainly made up of EXCLUSIVE-OR (EXOR) gates 251 and 290, comparators 254, 257, and 293, and a DATA flip-flop (D-FF) 255.

Figure 17A:
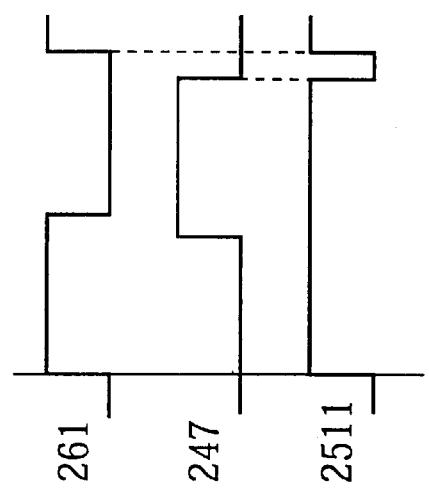
FIGS. 17A~17C each show a waveform of a pulse signal outputted in response to a phase difference between the synchronization data and the frequency-divided clock signal.
Figure 17B:
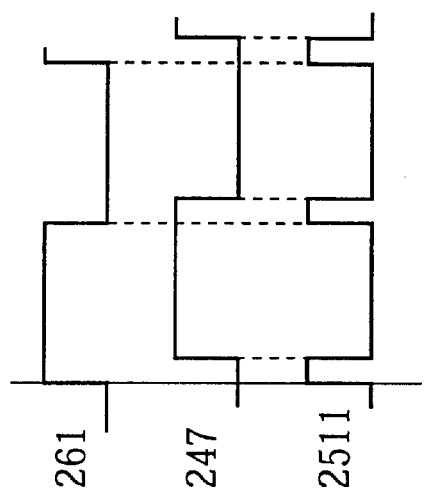
Figure 17C:
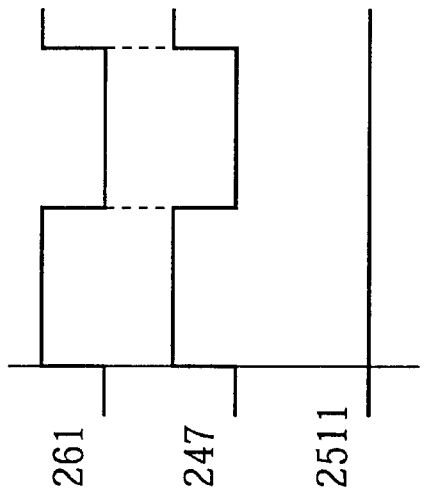

The EXOR gate 251 receives the serial data 260 and the frequency-divided clock signal 247 and outputs a pulse signal 2511 corresponding to the phase difference between the synchronization data 261 in the serial data 260 and the frequency-divided clock signal 247. If the two signals have no phase difference, the pulse signal 2511 will be in a pulse waveform shown in FIG. 17A. If the two signals have a slight phase difference, the pulse signal 2511 will be in a pulse waveform shown in FIG. 17B. If the two signals have a phase difference larger than 90°, the pulse signal 2511 will be in a pulse waveform shown in FIG. 17C.

This pulse signal 2511 is inputted into a 3-state buffer 252. Also, the enable signal 242 from the data demodulating unit 235 is inputted into a control terminal 2521 of the 3-state buffer 252. When the enable signal 242 is "0", the 3-state buffer 252 operates to directly output the pulse signal 2511 to an LPF 253. When the enable signal 242 is "1", the 3-state buffer 252 sets an output terminal thereof into a high impedance state so as not to pass a current to the LPF 253.

The LPF 253 is a well-known lowpass filter made up of a resistor and a capacitor and smooths the pulse signal 2511 into a direct voltage.

Figure 18:
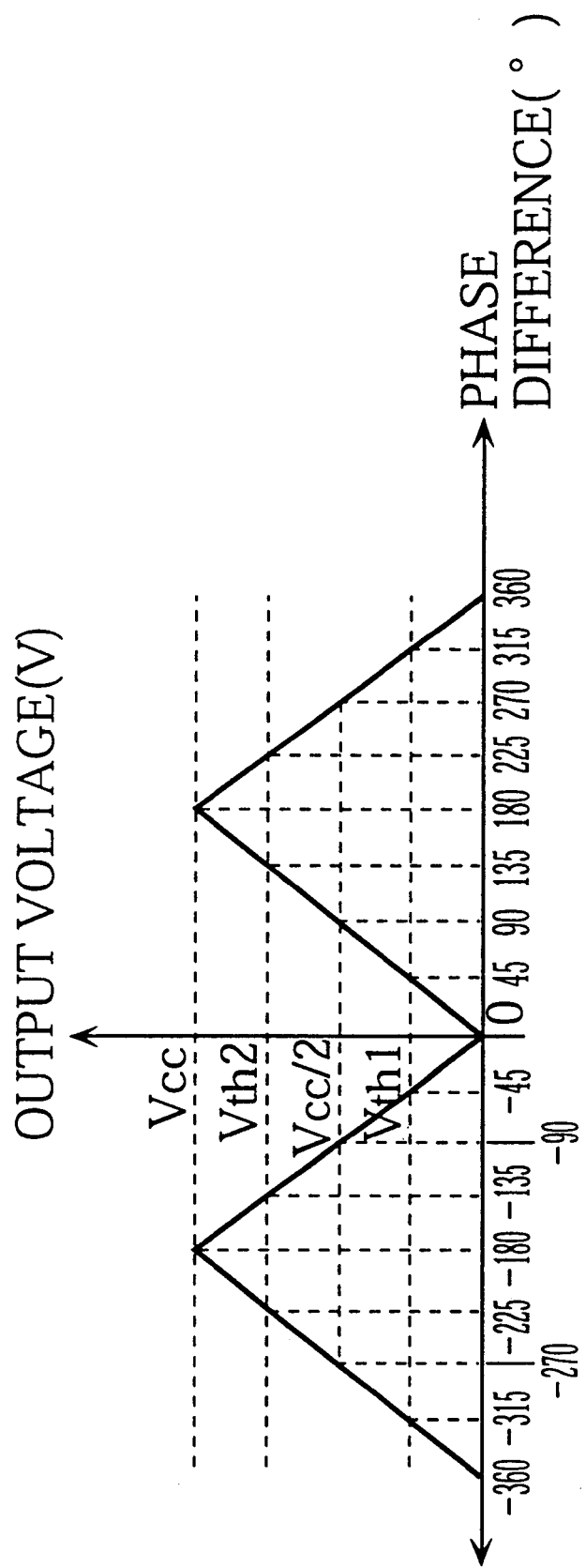
FIG. 18 shows the output voltage characteristic of an LPF in the data reception device.

FIG. 18 shows the output voltage characteristic of the LPF 253. The vertical axis represents the output voltage of the LPF 253, whereas the horizontal axis represents the phase difference between a rising edge of the synchronization data 261 and a rising edge of the frequency-divided clock signal 247. As shown in the figure, the LPF 253 outputs maximum voltage Vcc when the phase difference is 180°, outputs minimum voltage 0 when the phase difference is 0° or 360°, outputs voltage Vth1 that is ¼ of Vcc when the phase difference is 45° or 315°, and outputs voltage Vth2 that is ¾ of Vcc when the phase difference is 135° or 225°. Here, the phase difference is positive if the frequency-divided clock signal 247 lags behind the synchronization data 261, while the phase difference is negative if the frequency-divided clock signal 247 leads the synchronization data 261.

In FIG. 16, the output voltage of the LPF 253 is supplied to the comparators 254 and 257. The comparator 254 is a well-known voltage comparator that compares voltages inputted into input terminals 2541 and 2542 and outputs a signal ("0" or "1") corresponding to a sign of an input terminal to which the larger voltage is applied. The comparator 257 has the same construction as the comparator 254.

Reference voltage Vth1 is applied to the input terminal 2541 of the comparator.254, whereas reference voltage Vth2 is applied to an input voltage 2572 of the comparator 257. Reference voltages Vth1 and Vth2 correspond to Vth1 and Vth2 in FIG. 18, respectively.

Output signals of the comparators 254 and 257 are inputted into an AND gate 258 whose output signal is then inputted into D0 terminal of the D-FF 255.

The D-FF 255 is a well-known flip-flop that outputs a signal equivalent to a signal level ("0" or "1") of D0 terminal from Q terminal as the phase difference signal 246, on detecting a rising edge of a signal of CLK terminal, namely a rising edge of the enable signal 242 changing from "0" to "1". The signal level of Q terminal is retained until the next rising edge of the enable signal 242 is inputted into CLK terminal, that is, until the synchronization data 261 of the next frame is received. In doing so, the phase difference signal 246 remains unchanged during each frame so that switching between the first PLL circuit 210 and the second PLL circuit 211 will not occur within the frame. The output signal of the comparator 254 is also inputted into D1 terminal of the D-FF 255. When a rising edge of the enable signal 242 is inputted into CLK terminal, the signal present in D1 terminal at this point in time is outputted from Q1 terminal to the phase comparator 230 as the lock signal 2321.

Meanwhile, the serial data 260 and the frequency-divided clock signal 248 are inputted into the EXOR gate 290 that outputs a pulse signal 2901 corresponding to the phase difference between the synchronization data 261 in the serial data 260 and the frequency-divided clock signal 248. The waveform of the pulse signal 2901 varies in the same manner as the pulse signal 2511.

The pulse signal 2901 is then inputted into a 3-state buffer 291. Also, the enable signal 242 is inputted into a control terminal 2911 of the 3-state buffer 291. When the enable signal 242 is "0", the 3-state buffer 291 operates to directly output the pulse signal 2901 to an LPF 292. When the enable signal 242 is "1", the 3-state buffer 291 sets its output terminal into a high impedance state so as not to pass currents to the LPF 292.

The LPF 292 has the same construction and output voltage characteristic (see FIG. 18) as the LPF 253. The LPF 292 outputs a direct voltage to the comparator 293 which is a well-known voltage comparator same as the comparator 254. Reference voltage Vth3 (Vcc/2 in FIG. 18) is applied to an input terminal 2931 of the comparator 293. The comparator 293 then outputs a signal to D2 terminal of the D-FF 255. When a rising edge of the enable signal 242 is inputted into CLK terminal, a signal present in D2 terminal at this point in time is outputted from Q2 terminal to the phase comparator 231 as the lock signal 2322.

The phase difference detector 232 with the above construction operates in the following ways when the phase difference between the synchronization data 261 and the frequency-divided clock signal 247 is respectively in the ranges from 0° to 45°, from 45° to 135°, from 135° to 225°, from 225° to 315°, and from 315° to 360°.

FIG. 19 shows the phases of the synchronization data 261 and the frequency-divided clock signals 247 and 248.

Here, the synchronization data 261 has 360° (one cycle) between its two adjacent rising edges with the first rising edge being positioned at 0°. Also, the frequency-divided clock signal 248 constantly lags 90° behind the frequency-divided clock signal 247, as noted above.

Figure 19A:
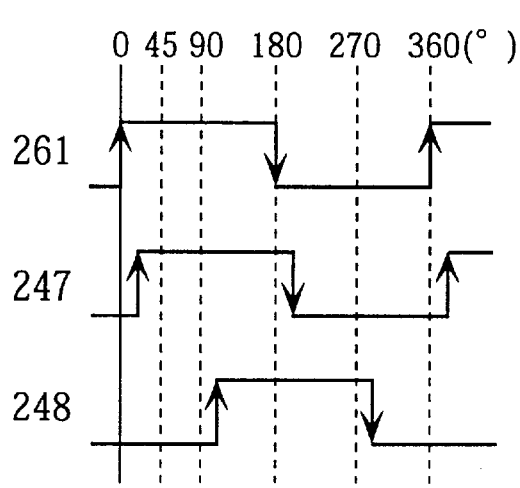
FIGS. 19~19D are schematic diagrams that each show phases of the synchronization data and two frequency-divided clock signals inputted in the phase difference detector.

If the phase difference between the synchronization data 261 and the frequency-divided clock signal 247 is below 45° (FIG. 19A), the output voltage of the LPF 253 is smaller than Vth1 in accordance with FIG. 18, so that the output signal of the comparator 254 and the output signal of the AND gate 258 become "0". When the enable signal 242 changes from "0" to "1", this rising edge of the enable signal 242 is inputted into CLK terminal and hence Q terminal (phase difference signal 246) and Q1 terminal (lock signal 2321) are latched at "0". As a result, the first PLL circuit 210 is triggered to synchronize the same-directional edges of the synchronization data 261 and the frequency-divided clock signal 247 in the phase comparator 230. Which is to say, among same-directional edges of the synchronization data 261 and frequency-divided clock signal 247 or 248 and opposite-directional edges of the synchronization data 261 and frequency-divided clock signal 247 or 248, the rising edges of the synchronization data 261 and the frequency-divided clock signal 247 that have the smallest phase difference as shown in FIG. 19A are synchronized. The smaller the phase difference, the smaller amount of phase adjustment is necessary, so that the time required for the phase equalization can be reduced. Meanwhile, since the phase difference between the synchronization data 261 and the frequency-divided clock signal 248 is above 90°, the output voltage of the LPF 292 is larger than Vth3 as in FIG. 18 and accordingly Q2 terminal (lock signal 2322) becomes "1". However, the lock signal 2322 does not affect the operation of the first PLL circuit 210, as the phase comparator 231 is in a stopped state in this case.

Figure 19B:
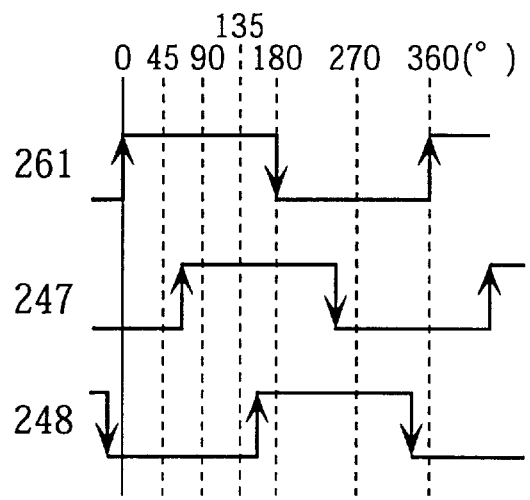

On the other hand, if the phase difference between the synchronization data 261 and the frequency-divided clock signal 247 is over 45° and below 135° (FIG. 19B), the output voltage of the LPF 253 lies between Vth1 and Vth2 according to FIG. 18, so that Q terminal becomes "1" which triggers the second PLL circuit 211. Meanwhile, Q1 terminal becomes "1". Since the phase difference between the rising edges of the synchronization data 261 and frequency-divided clock signal 248 is above 90°, the output voltage of the LPF 292 is larger than Vth3 and so Q2 terminal becomes "1". Accordingly, the phase comparator 231 operates to synchronize the synchronization data 261 and the frequency-divided clock signal 248 at their opposite-directional edges. Which is to say, as shown in FIG. 19B the falling edges of the synchronization data 261 and the rising edges of the frequency-divided clock signal 248 that have the smallest phase difference in this case are synchronized.

Figure 19C:
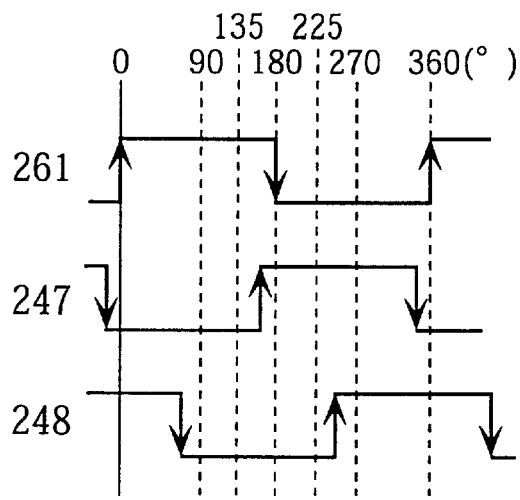

If the phase difference between the synchronization data 261 and the frequency-divided clock signal 247 is over 135° and below 225° (FIG. 19C), the output voltage of the LPF 253 is above Vth2 in FIG. 18, so that Q terminal becomes "0" which triggers the first PLL circuit 210. Meanwhile, Q1 and Q2 terminals are both "1". As a result, the phase comparator 230 operates to synchronize the synchronization data 261 and the frequency-divided clock signal 247 at their opposite-directional edges. Which is to say, as shown in FIG. 19C the falling edges of the synchronization data 261 and the rising edges of the frequency-divided clock signal 247 that have the smallest phase difference in this case are synchronized.

Figure 19D:
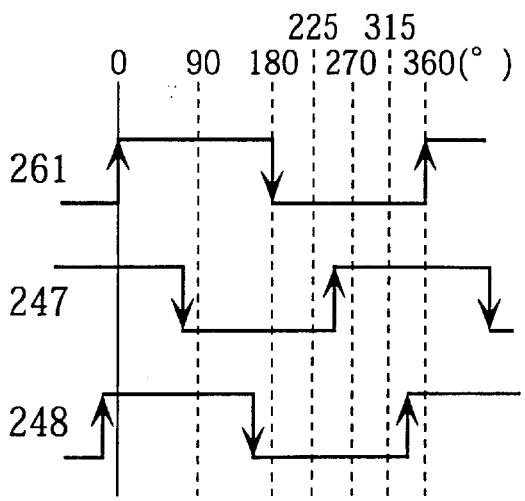

If the phase difference between the synchronization data 261 and the frequency-divided clock signal 247 is over 225° and below 315° (FIG. 19D), the output voltage of the LPF 253 lies between Vth1 and Vth2 in FIG. 18, so that Q terminal becomes "1" which triggers the second PLL circuit 211. Meanwhile, Q1 and Q2 terminals are respectively "1" and "0". As a result, the phase comparator 231 operates to synchronize the synchronization data 261 and the frequency-divided clock signal 248 at their same-directional edges. Which is to say, as shown in FIG. 19D the rising edges of the synchronization data 261 and the rising edges of the frequency-divided clock signal 248 that have the smallest phase difference in this case are synchronized.

If the phase difference between the synchronization data 261 and the frequency-divided clock signal 247 is over 315° and below 360°, the output voltage of the LPF 253 is under Vth1, so that Q terminal becomes "0" which triggers the first PLL circuit 210. Meanwhile, Q1 and Q2 terminals both become "0". Accordingly, the phase comparator 230 operates to synchronize the synchronization data 261 and the frequency-divided clock signal 247 at their same-directional edges. Which is to say, the rising edges of the synchronization data 261 and the rising edges of the frequency-divided clock signal 247 that have the smallest phase difference in this case are synchronized as in the case of FIG. 19A.

Thus, the phase difference detector 232 sets the output levels ("0" or "1") of the phase difference signal 246 and lock signals 2321 and 2322 such that edges of two signals with the smallest phase difference will be synchronized. Accordingly, however large a phase difference exists between the synchronization data 261 and the frequency-divided clock signal 247 or 248, the phase equalization is executed speedily. This feature has an advantage of shortening the time of generating the reception clock signal 244 compared with the conventional method of synchronizing only the same-directional edges, thereby accelerating the transmission of the synchronization data 261. Consequently, the data transfer efficiency is improved.

While in FIGS. 19A~19D the frequency-divided clock signal 247 has lagged behind the synchronization data 261, the same results as above are obtained when the frequency-divided clock signal 247 leads the synchronization data 261. Also, while the phase difference between the rising edges of the synchronization data 261 and frequency-divided clock signal 247 has been used as the reference in the above example, the phase difference detector 232 may use the phase difference between the rising edges of the synchronization data 261 and frequency-divided clock signal 248 as the reference to set the output levels of the phase difference signals 246 and lock signals 2321 and 2322. Further, the phase difference may be detected for the synchronization data 261 relative to the frequency-divided clock signal 247 or 248, instead of detecting the phase difference for the frequency-divided clock signal 247 or 248 relative to the synchronization data 261.

Figure 20:
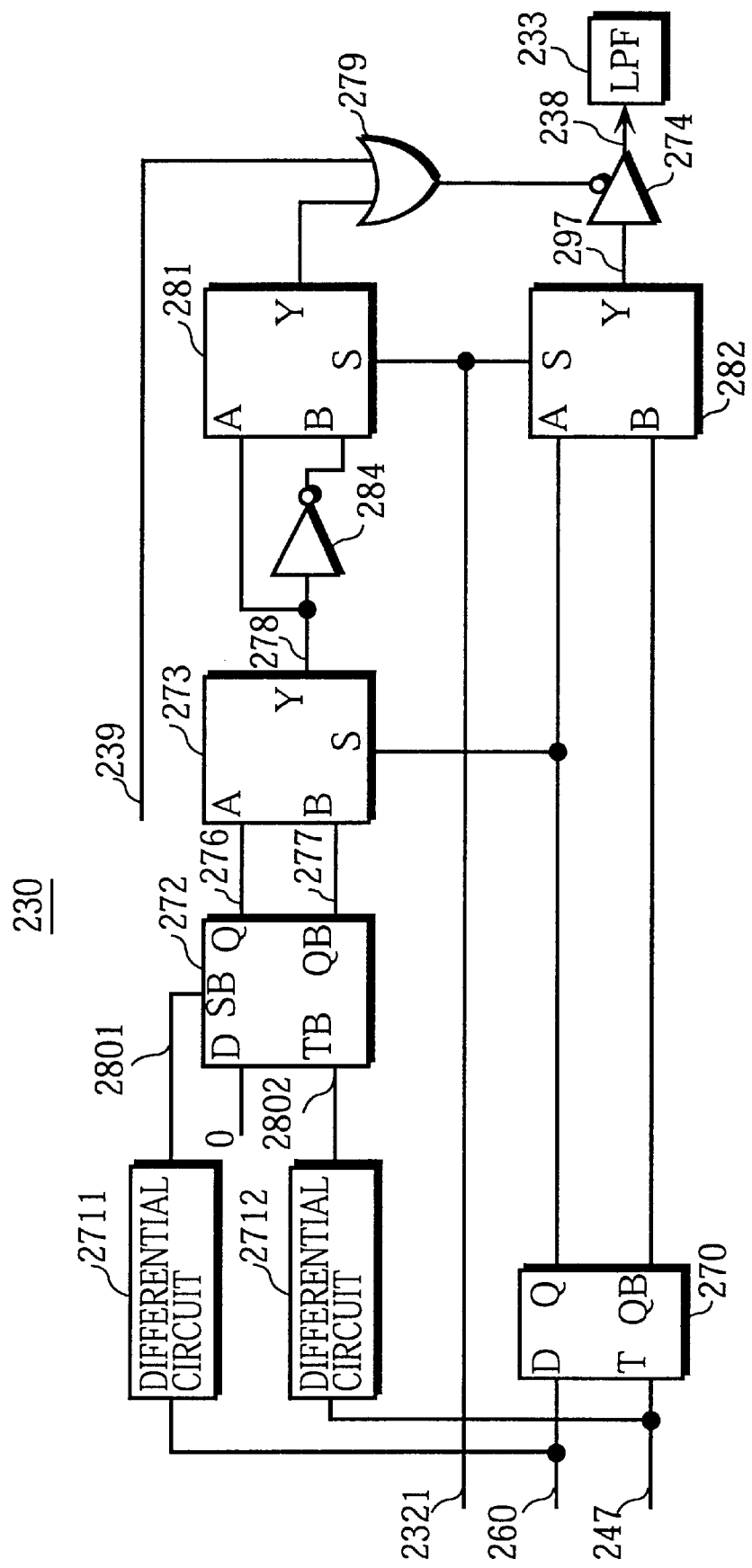
FIG. 20 shows the circuit construction of a phase comparator in the data reception device.

FIG. 20 shows the circuit construction of the phase comparator 230, whereas FIG. 21 shows signal waveforms seen in the phase comparator 230. First, the operation of the phase comparator 230 when the frequency-divided clock signal 247 lags the synchronization data 261 by less than 245° is described below with reference to FIG. 21A.

The phase comparator 230 is roughly made up of a D-FF 270, differential circuits 2711 and 2712, and selectors 273, 281, and 282.

The D-FF 270 is a flip-flop that latches the synchronization data 261 inputted in D terminal on a rising edge of the frequency-divided clock signal 247 inputted in T terminal. In FIG. 19A, for example, the frequency-divided clock signal 247 lags behind the synchronization data 261, so that Q terminal and QB terminal in the D-FF 270 are respectively "1" and "0".

The differential circuit 2711 is a well-known differential circuit that outputs a negative differential pulse signal 2801 when a rising or falling edge of the incoming synchronization data 261 is detected. Similarly, the differential circuit 2712 outputs a negative differential pulse signal 2802 when a rising or falling edge of the incoming frequency-divided clock signal 247 is detected. The output signals 2801 and 2802 of the respective differential circuits 2711 and 2712 are inputted into an asynchronous set D-FF 272.

The asynchronous set D-FF 272 sets Q and QB terminals respectively to "1" and "0" when SB terminal is "0", while constantly retaining D terminal at "0". Accordingly, if pulse signal 2802 of a falling edge is inputted into TB terminal, Q and QB terminals are set respectively to "0" and "1".

Figure 21A:
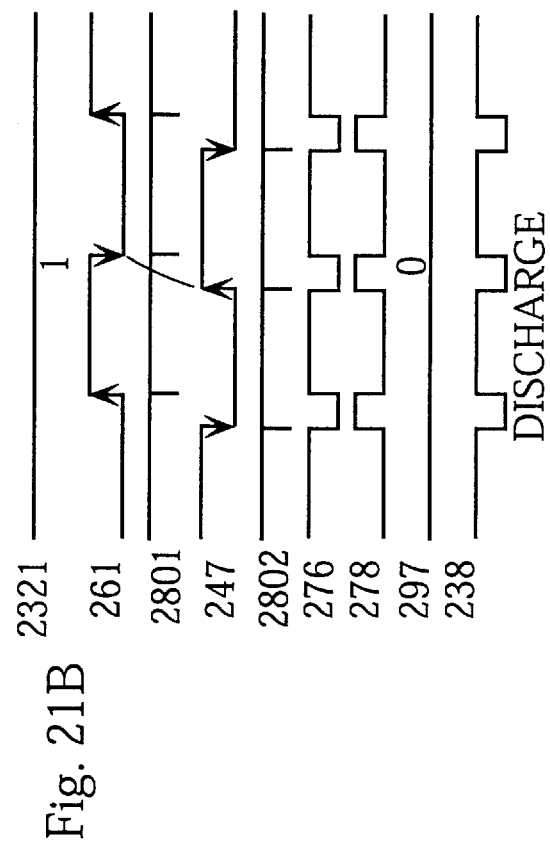
FIGS. 21A~21D each show waveforms of signals flowing in the phase comparator.

As a result, a pulse signal 276 shown in FIG. 21A is outputted from Q terminal, and a pulse signal 277 which is an inverted version of the pulse signal 276 is outputted from QB terminal in the present example.

The selector 273 is a well-known selector that outputs the signal of A terminal from Y terminal when S terminal is "0", and outputs the signal of B terminal from Y terminal when S terminal is "1". The selectors 281 and 282 have the same construction as the selector 273.

In the present example, Q terminal of the D-FF 270 remains "1", so that the signal of B terminal is outputted from Y terminal in the selector 273. Here, if the frequency-divided clock signal 247 lags the synchronization data 261 by less than 45° (as in the case of FIG. 19A), the lock signal 2321 outputted from the phase difference detector 232 is "0", so that the selector 281 outputs the signal of A terminal from Y terminal. In other words, the pulse signal 277 outputted from QB terminal in the asynchronous set D-FF 272 is sent to and outputted from Y terminal of the selector 281. The output signal 239 of the phase comparator selecting unit 250 is used for triggering the first PLL circuit 210 and is "0" in this case. Hence an output signal of an OR gate 279 has a waveform identical to the pulse signal 277. Meanwhile, since S terminal in the selector 282 is "0", a signal 297 of Y terminal is "1". A 3-state buffer 274 is activated to output the signal 297 when the output signal of the OR gate 279 is "0". A waveform of the resulting output signal (phase difference signal) 238 is an inverted version of the pulse signal 277 (i.e. identical to the pulse signal 276), as shown in FIG. 21A. That is to say, when and only when the phase difference signal 238 is "1", the 3-state buffer 274 operates to pass currents to the LPF 233 (charge). This results in an increase in the output voltage of the LPF 233, an increase in the output frequency of the VCO 234, and eventually an advance of the phase of the frequency-divided clock signal 247. On the other hand, when the phase difference signal 238 is "0", the 3-state buffer 274 does not operate but goes into a high impedance state in its output terminal, so that the LPF 233 will not be charged.

Next, the operation of the phase comparator 230 when the frequency-divided clock signal 247 lags the synchronization data 261 by over 135° and below 180° is explained below with reference to FIG. 21B.

In this case, Q and QB terminals of the D-FF 270 are "1" and "0", respectively. The selector 273 accordingly outputs the signal of B terminal from Y terminal. Also, since the lock signal 2321 is "1" in this case, a signal produced by a NOT gate 284 inverting the signal 278 of Y terminal in the selector 273 is inputted into B terminal and outputted from Y terminal in the selector 281. Meanwhile, S terminal of the selector 282 is "1", so that the signal 297 of Y terminal is "0". Accordingly, a waveform of the resulting phase difference signal 238 is identical to the pulse signal 276, as shown in FIG. 21B. That is to say, when and only when the phase difference signal 238 is "−1", the 3-state buffer 274 operates to retract currents from the LPF 233 (discharge) to decrease the output voltage of the LPF 233. As a result, the output frequency of the VCO 234 decreases, and eventually the phase of the frequency-divided clock signal 247 is delayed. On the other hand, when the phase difference signal 238 is "0", the 3-state buffer 274 does not operate but goes into a high impedance state in its output terminal, so that the LPF 233 will not be discharged.

Figure 21C:
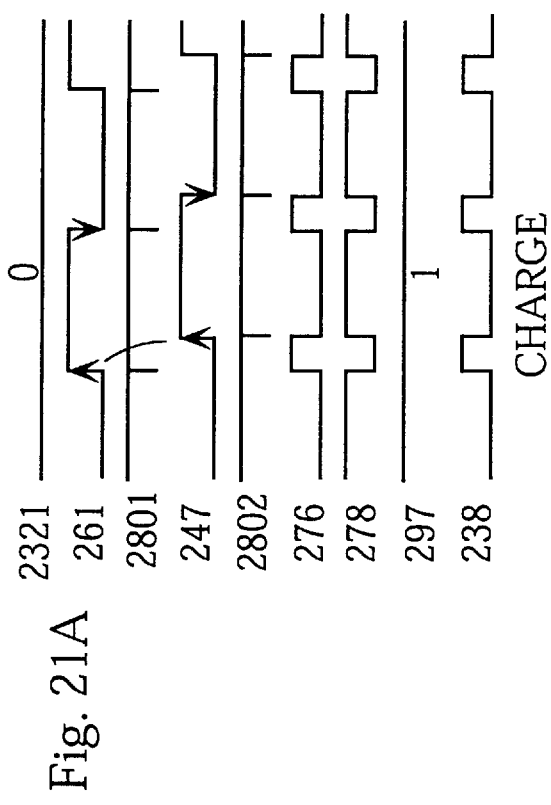
Figure 21B:
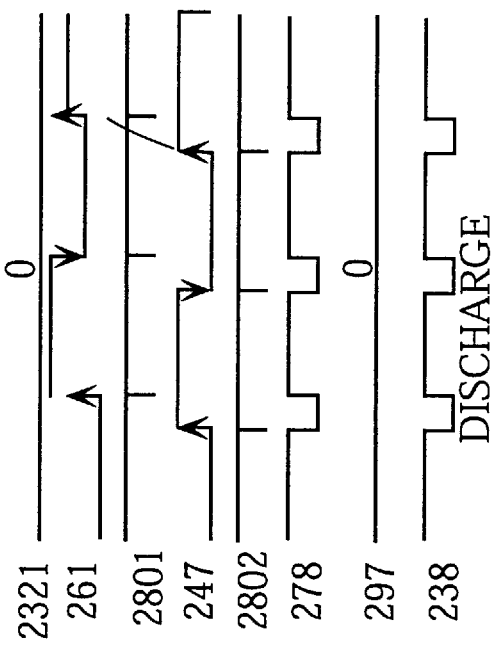

FIG. 21C shows a waveform of the phase difference signal 238 when the frequency-divided clock signal 247 lags the synchronization data 261 by over 180° and below 225°.

In this case, Q and QB terminals of the D-FF 270 are "0" and "1", respectively. The selector 273 accordingly outputs the signal of A terminal from Y terminal. Also, since the lock signal 2321 is "1", a signal produced by inverting the signal 278 of Y terminal in the selector 273 is sent to and outputted from Y terminal in the selector 281. Meanwhile, S terminal of the selector 282 is "1" and the signal 297 of Y terminal is "1", so that the resulting phase difference signal 238 has a waveform same as FIG. 21A. As a result, the phase of the frequency-divided clock signal 247 advances.

Figure 21D:
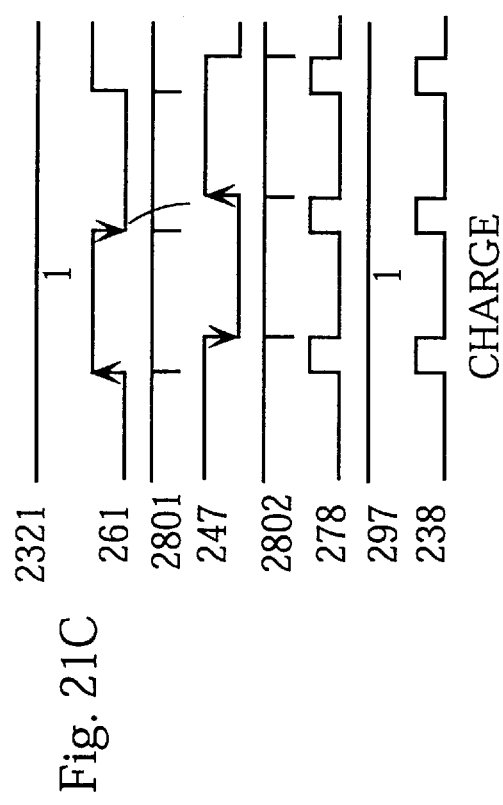

FIG. 21D shows a waveform of the phase difference signal 238 when the frequency-divided clock signal 247 lags the synchronization data 261 by over 315° and under 360°.

In this case, Q and QB terminals of the D-FF 270 are respectively "0" and "1", so that the selector 273 outputs the signal of A terminal from Y terminal. Also, since the lock signal 2321 is "0", the signal 278 of Y terminal in the selector 273 is sent to and outputted from Y terminal of the selector 281. Meanwhile, S terminal of the selector 282 is "0" and the signal 297 of Y terminal is "0", with the resulting phase difference signal 238 having a waveform identical to FIG. 21B. As a result, the phase of the frequency-divided clock signal 247 is delayed.

As described above, the phase comparator 230 is constructed such that the phase difference signal 238 is generated based on a phase difference between either the same-directional edges or opposite-directional edges of the two signals. Therefore, by switching of the output level of the lock signal 2321, the synchronization data 261 and the frequency-divided clock signal 247 can be synchronized at any of their same-directional edges and opposite-directional edges in the first PLL circuit 210.

The phase comparator 231 has the same construction as the phase comparator 230, so that the synchronization data 261 and the frequency-divided clock signal 248 can be synchronized at any of their same-directional edges and opposite-directional edges in the second PLL circuit 211.

Thus, in the PLL unit 200 one of the first PLL circuit 210 and the second PLL circuit 211 is selected to perform synchronization and further the selected PLL circuit is controlled to perform the synchronization using either the same-directional edges or the opposite-directional edges, based on phase differences between the synchronization data 261 and the frequency-divided clock signals 247 and 248. When compared with the conventional method using only the same-directional edges, the synchronization is executed more speedily. Accordingly, the transmission of the synchronization data 261 is accelerated, with it being possible to improve the data transfer efficiency while maintaining a high degree of reliability.

When phase equalization was performed on the synchronization data 261 and the frequency-divided clock signal 247 in the first PLL circuit 210, the data demodulating unit 235 latches the subsequently transmitted start bit data 262 and effective data 263 on the falling edges of the reception clock signal 244 for sampling, as shown in FIG. 13.

Here, each falling edge of the reception clock signal 244 appears at the center of a bit of the effective data 263. Even when the phase of the reception clock signal 244 slightly deviates over time, the effective data 263 is sampled at an accurate level ("0" or "1"), thereby maintaining the high degree of reliability in data transfer.

When, on the other hand, the phase equalization was performed on the synchronization data 261 and the frequency-divided clock signal 248 in the second PLL circuit 211, the data demodulating unit 235 latches the subsequently transmitted data on the rising edges of the reception clock signal 244. Since the frequency-divided clock signal 248 has been produced by frequency dividing the reception clock signal 244 by 2 on its falling edges, the falling edges of the reception clock signal 244 are in sync with the rising and falling edges of the effective data 263 and hence each rising edge of the reception clock signal 244 appears at the center of a bit of the effective data 263.

Figure 22:
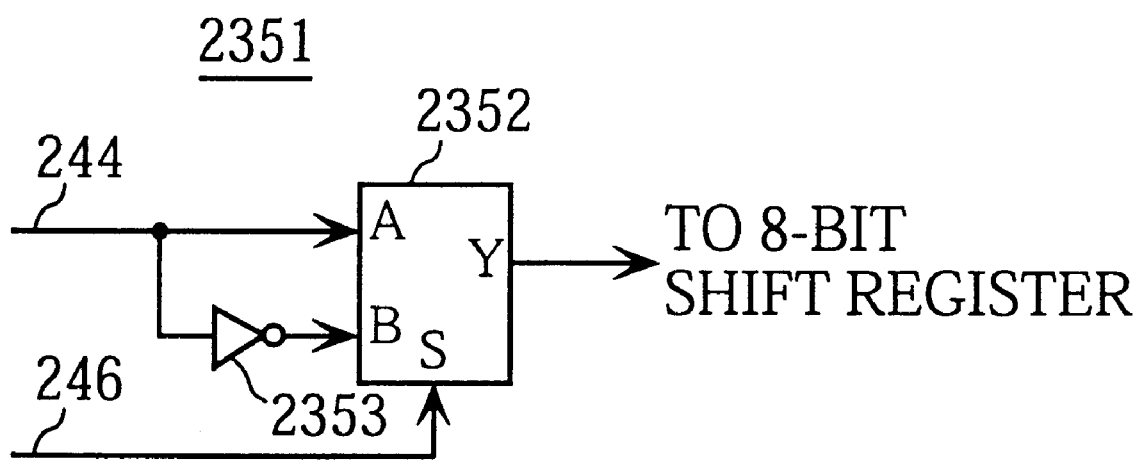
FIG. 22 shows the construction of a latch switching unit equipped in a data demodulating unit in the data reception device.

FIG. 22 shows a latch switching unit 2351 equipped in the data demodulating unit 235. A selector 2352 in the latch switching unit 2351 is a well-known selector that outputs a signal of A terminal from Y terminal if S terminal is "0", and outputs a signal of B terminal from Y terminal if S terminal is "1". As mentioned above, the phase difference signal 246 is "0"when the first PLL circuit 210 was selected. Accordingly, S terminal is "0", so that the reception clock signal 244 itself is sent to an 8-bit shift register (not illustrated). The 8-bit shift register latches the incoming effective data 263 in units of bits on a falling edge of the reception clock signal 244.

When the second PLL circuit 211 was selected, the phase difference signal 246 is "1" and so S terminal in the selector 2352 becomes "1". In this case, the reception clock signal 244 is inverted in a NOT gate 2353 and then outputted from Y terminal of the selector 2352 to the 8-bit shift register.

The 8-bit shift register is a circuit for latching the effective data 263 on the falling edges of the reception clock signal 244. Therefore, by means of the inversion of the reception clock signal 244 before sending it to the 8-bit shift register, the latching by the shift register in this case is the equivalent of latching the effective data 263 on the rising edges of the reception clock signal 244.

As described above, the data reception device 300 synchronizes the synchronization data 261 and the reception clock signal 244 on their edges where the phase difference between the two signals is smallest. Accordingly, the synchronization is executed faster than the conventional method whereby the two signals are synchronized at their same-directional edges alone.

The following are possible modifications of the second embodiment.

While in the above embodiment the first and second PLL circuits 210 and 211 have been switched selectively, the PLL unit 200 may instead form the first PLL circuit 210 alone for generating the reception clock signal 244. In such a case, the frequency-divided clock signal 248 is omitted and the phase difference detector 232 sets the output level of the lock signal 2321 so that the synchronization data 261 and the frequency-divided clock signal 247 will be synchronized at any of their same-directional edges and opposite-directional edges that have the smaller phase difference. With this configuration, the time taken for the phase equalization is still reduced compared with the conventional synchronization using only the same-directional edges. Also, such a circuit can be configured simply with less cost. Note that in this case the effective data 263 is sampled on the falling edges of the reception clock signal 244.

While in the above embodiment the reception clock signal 244 has been frequency divided by 2 and the frequency-divided clock signals 247 and 248 have been created for phase equalization with the synchronization data 261, the present invention is not limited to such. For instance, two pulse signals may be generated by frequency dividing the reception clock signal 244 by 4 with the phase of one of the pulse signals being delayed by 90°. Performing phase equalization using the synchronization data 261 and these two pulse signals can produce the same effect of reducing the phase equalization time as in the above embodiment. This also applies to the case where the frequency dividers 236 and 237 are omitted and the reception clock signal. 244 is not frequency divided. Without frequency division the reception clock signal 244 and the synchronization data 261 have the same frequency. Here, when the reception clock signal 244 and the synchronization data 261 are synchronized at their same-directional edges or opposite-directional edges, a sampling edge of the reception clock signal 244 matches a rising edge or falling edge of the effective data 263. If the phase of the reception clock signal 244 deviates even slightly in such a state, signal levels of the effective data 263 cannot be sampled with accuracy. To avoid this, the latch switching unit 2351 may be replaced with a well-known phase adjustment circuit that is capable of changing the phase by, for example, 180°. As a result, a rising or falling edge of the reception clock signal 244 whose phase has deviated will be positioned at around the center of each bit of the effective data 263. Accordingly, the effective data 263 can be accurately sampled on any edge of the reception clock signal 244, and the reliability of the data transfer can be improved.

Alternatively, by generating multiple frequency-divided clock signals that are mutually out of phase and performing the phase equalization on the synchronization data 261 and these frequency-divided clock signals, the phase equalization time can further be reduced. Suppose a frequency-divided clock signal 2471 (not illustrated) that lags the frequency-divided clock signal 247 by 45° is generated and a third PLL circuit for performing phase equalization on the synchronization data 261 and the frequency-divided clock signal 2471 is added to the PLL unit 200. This being so, the phase difference detector 232 detects edges of the synchronization data 261 and one of the frequency-divided clock signals 247, 248 and 2471 where the phase difference is smallest, and activates one of the first to third PLL circuits to synchronize the detected edges of the synchronization data 261 and the frequency-divided clock signal. Since the three PLL circuits are selectively switched based on the phase differences between the synchronization data 261 and the three frequency-divided clock signals 247, 248 and 2471, the amount of phase adjustment in the above embodiment is further lessened and thus the phase equalization is accelerated even further.

While the reception clock signal 244 has been generated from the synchronization data 261 using the first and second PLL circuits 210 and 211 in the above embodiment, this configuration can be modified as long as the reception clock signal 244 is generated in phase with the synchronization data 261.

Third Embodiment

The following is a description of a data reception device of the third embodiment of the present invention which is applied to a copier. The general configuration of the copier in this embodiment is identical to the second embodiment shown in FIG. 11 except the data reception device 300, so that the following description focuses on the configuration and operation of the data reception device 300.

(1) Configuration of Data Reception Device 300

Figure 23:
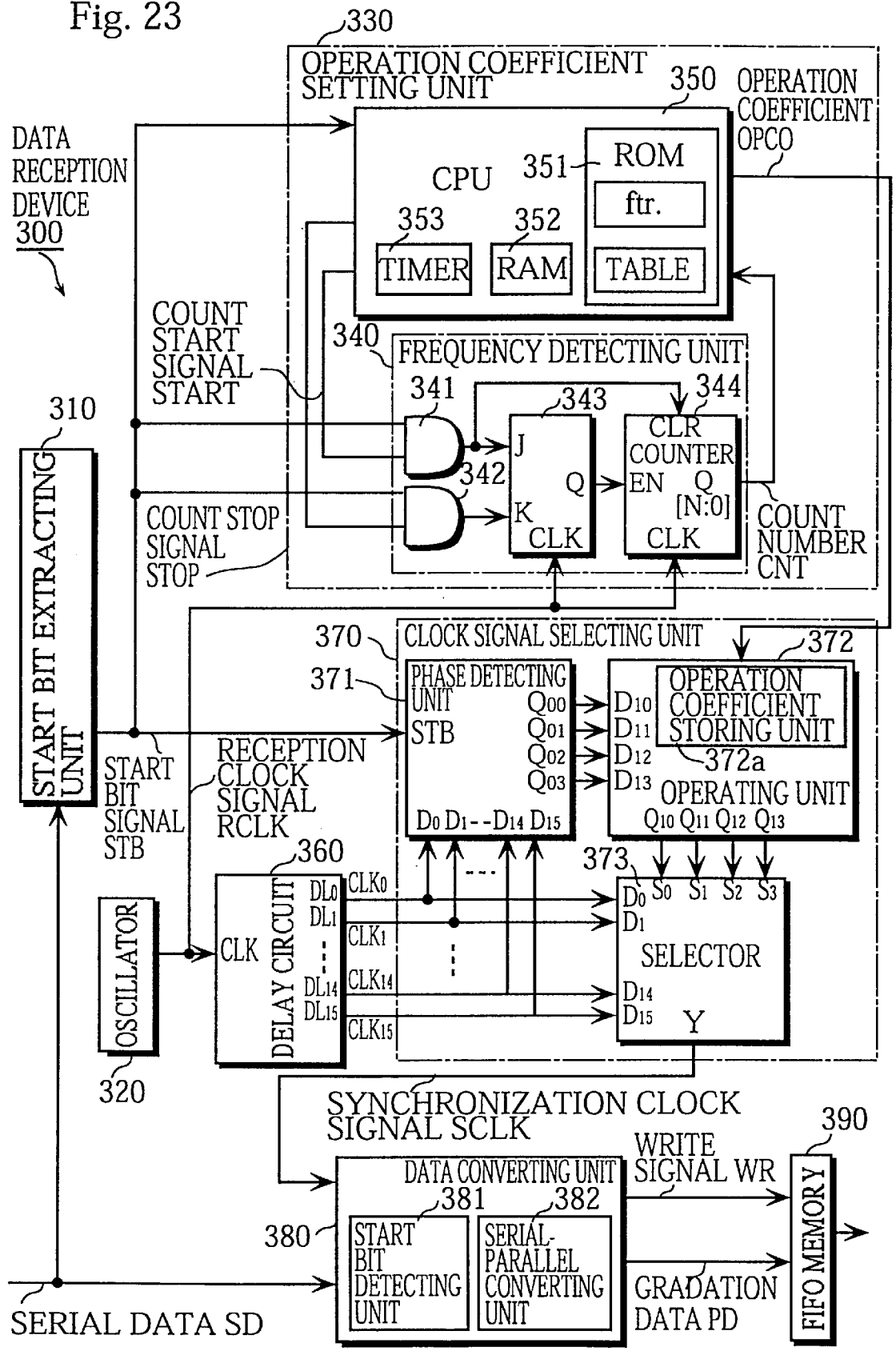
FIG. 23 is a block diagram showing the configuration of a data reception device of the third embodiment of the present invention.
Figure 24:
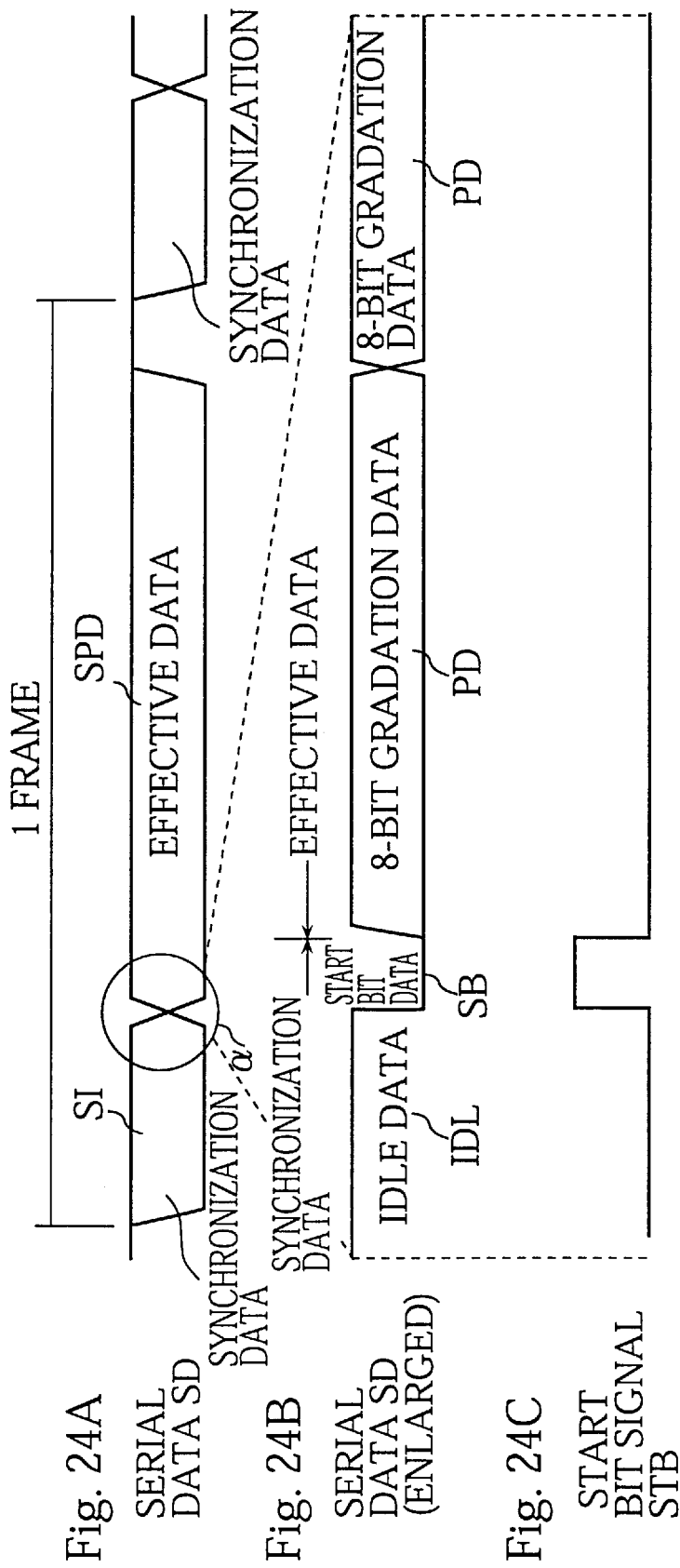
FIGS. 24A~24C show the structure of serial data transmitted from the image reading unit to the data reception device and a waveform of start bit signal.

FIG. 23 shows the detailed configuration of the data reception device 300 of the third embodiment, whereas FIG. 24 shows serial data SD sent from the image reading unit 110 to the data reception device 300 in the scanning unit 130 and start bit signal STB outputted from a start bit extracting unit 310 in the data reception device 300.

The data reception device 300 receives serial data SD from the image reading unit 110 and latches gradation data included in serial data SD. The data reception device 300 includes the start bit extracting unit 310, an oscillator 320 for outputting reception clock signal RCLK, a delay circuit 360 for generating delayed clock signals CLK0~CLK15 that are equal to reception clock signal RCLK in frequency and differs with reception clock signal RCLK in phase based on reception clock signal RCLK, a clock signal selecting unit 370 for selecting a predetermined delayed clock signal for each frame from delayed clock signals CLK0~CLK15 and outputting the selected delayed clock signal as synchronization clock signal SCLK, an operation coefficient setting unit 330 for setting operation coefficient OPCO which indicates an amount of phase adjustment used for the selection by the clock signal selecting unit 370, a data converting unit 380 for latching gradation data in serial data SD according to synchronization clock signal SCLK and serial-to-parallel converting the latched gradation data in units of pixels, and a FIFO (First-In First-Out) memory 390 for temporarily storing the converted gradation data. The clock signal selecting unit 370 is roughly made up of a phase detecting unit 371, an operating unit 372, and a selector 373. The operation coefficient setting unit 330 is roughly made up of a CPU 350 and a frequency detecting unit 340 equipped with AND gates 341 and 342, a JK-FF 343 and a counter 344.

Serial data SD transmitted from the image reading unit 110 includes synchronization data SI and effective data SPD that follows, as shown in FIG. 24A. In this embodiment, data strings corresponding to frames that each include synchronization data SI and effective data SPD are consecutively transmitted in sync with a transmission clock signal (with frequency ftr. (e.g. 100 MHz)) of an oscillator (not illustrated) equipped in the image reading unit 110. FIG. 24B is an enlarged view of part α in FIG. 24A. Synchronization data SI includes start bit data SB which is level L in 1 bit time to show the start of effective data SPD and idle data IDL, arranged before start bit data SB, which is level H in several consecutive bit times to help detection of start bit data SB. Effective data SPD includes sets of 8-bit (corresponding to one pixel) gradation data PD that are arranged in serial for a specified length (corresponding to one scan line). Although in FIG. 24B a delimiter between each adjacent two sets of 8-bit gradation data PD is omitted for an increase in an amount of data to be transmitted in a frame, the delimiter may be inserted between each adjacent two sets of 8-bit gradation data PD if the amount of transmission data included in the frame allows. Serial data SD is sent to the start bit extracting unit 310 and data converting unit 380.

The start bit extracting unit 310 monitors synchronization data SI in serial data SD to extract start bit data SB.

Whenever start bit data SB is extracted from synchronization data SI, the start bit extracting unit 310 outputs a pulse (start bit signal STB) which is level H in 1 bit time (FIG. 24C), to the CPU 350 and AND gates 341 and 342 in the operation coefficient setting unit 330 and to the phase detecting unit 371 in the clock signal selecting unit 370.

Figure 25:
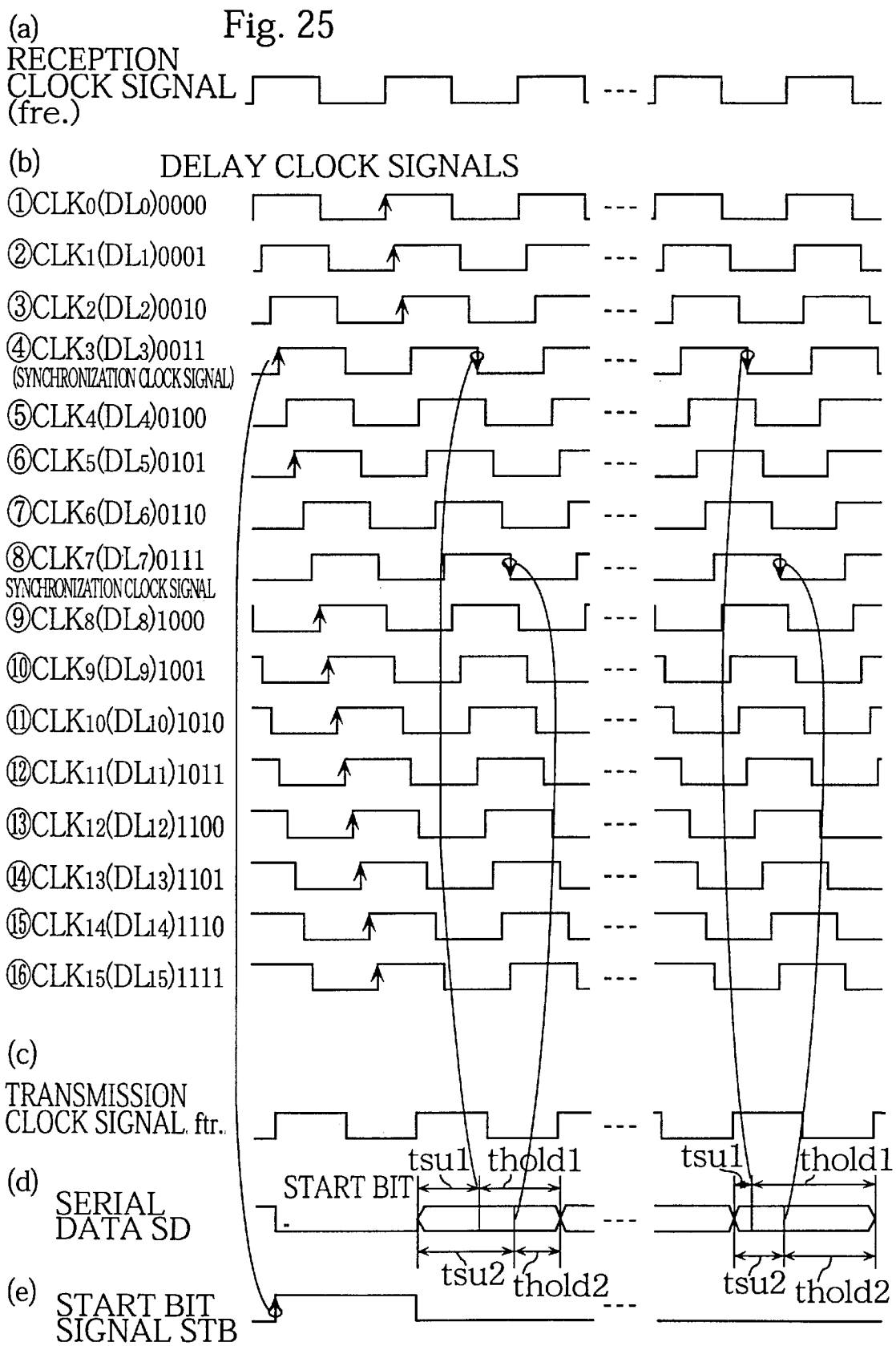
FIG. 25 shows waveforms of a reception clock signal and other signals in a frame.

The oscillator 320 is provided with a crystal oscillator to ensure high stability of the generated frequency, and outputs reception clock signal RCLK (see FIG. 25) whose frequency fre. is approximately equal to frequency ftr. of the transmission clock signal. Here, reception clock signal RCLK is asynchronous to the transmission clock signal. Reception clock signal RCLK is supplied to the JK-FF 343 and counter 344 in the operation coefficient setting unit 330 as well as to the delay circuit 360. FIG. 25 shows waveforms of reception clock signal RCLK and delayed clock signals CLK0~CLK15 in a frame (data for one scan line). For convenience of explanation, waveforms of the transmission clock signal, serial data SD, and start bit signal STB are illustrated, too. Also, the left side of the figure shows the bit time of start bit data SB and its vicinity in a frame, whereas the right side of the figure shows the last bit time of the frame and its vicinity. Further, the state where frequency fre. is slightly higher than frequency ftr. due to a small error (plus or minus several tens of ppm) of the crystal oscillator in the oscillator 320 is a little exaggerated for purposes of illustration.

The delay circuit 360 is made up of reception clock signal input terminal CLK which receives reception clock signal RCLK, 16 delayed clock signal output terminals DL0~DL15, and a plurality of gates (not illustrated) placed between reception clock signal input terminal CLK and delayed clock signal output terminals DL1~DL15. Delayed clock signal output terminal DL0 is direct-coupled to reception clock signal input terminal CLK. Each of the plurality of gates is formed by a semiconductor and possesses a characteristic of taking predetermined time (delay time) to convey a change in its input channel to its output channel. The number of gates between reception clock signal input terminal CLK and each delayed clock signal output terminal increases from delayed clock signal output terminal DL1 to delayed clock signal output terminal DL15. As a result, a phase difference of an output delayed clock signal relative to reception clock signal RCLK, namely delay time of the output delayed clock signal, increases from delayed clock signal output terminal DL1 to delayed clock signal output terminal DL15. The predetermined delay time used here is such that a phase difference with reception clock signal RCLK increases by $2\pi/16$. Accordingly, delayed clock signals CLK0~CLK15 outputted respectively from delayed clock signal output terminals DL0~DL15 are out of phase with each other by $2\pi/16$, as shown by delayed clock signals ①~⑯ in FIG. 25. Note that 4-bit binary codes "0000"~"1111" are assigned to delayed clock signals CLK0~CLK15, respectively.

The phase detecting unit 371 in the clock signal selecting unit 370 is equipped with input terminal STB for receiving start bit signal STB, input terminals D0~D15 for receiving respective delayed clock signals CLK0~CLK15, and output terminals Q00~Q03 for outputting a 4-bit binary code. Whenever start bit signal STB is inputted, the phase detecting unit 371 compares the rising edge of start bit signal STB (see FIG. 25) with a rising edge of each of delayed clock signals CLK0~CLK15 within 1 bit time from the rising edge of start bit signal STB, selects one of delayed clock signals CLK0~CLK15 whose rising edge first appears after the rising edge of start bit signal STB, and outputs a binary code assigned to the selected delayed clock signal via output terminals Q00~Q03. In FIG. 25, for instance, a binary code "0011" given to delayed clock signal CLK3 is outputted.

Since the transmission clock signal and reception clock signal RCLK are asynchronous to each other in the asynchronous serial transmission, reception clock signal RCLK is generated without reference to the phase of the transmission clock signal, so that it is undefined at which point in a bit time of the transmission clock signal a reading edge of reception clock signal RCLK appears. On the other hand, for a delayed clock signal whose rising edge first appears after the rising edge of start bit signal STB, its rising edge approximately matches a rising edge of the transmission clock signal, so that it is possible to equalize the phases of such a delayed clock signal and the transmission clock signal. Even if frequency ftr. and frequency fre. differ with each other in some degree, immediately after the phase equalization the falling edge (reading edge) of the delayed clock signal lies in around the center of the bit time following start bit data SB. Therefore, a predetermined amount of gradation data can be latched with high stability.

The operating unit 372 in the clock signal selecting unit 370 is provided with input terminals D10~D13 respectively connected to output terminals Q00~Q03 of the phase detecting unit 371, an operation coefficient storing unit 372a for storing operation coefficient OPCO expressed in 4-bit binary code outputted from the CPU 350 in the operation coefficient setting unit 330, and output terminals Q10~Q13. The operating unit 372 performs addition or subtraction on the binary code inputted via input terminal D10~D13 and operation coefficient OPCO for correcting this binary code by a predetermined amount of phase adjustment, and outputs the operation result (4-bit binary code) from output terminals Q10~Q13 as a select signal, ignoring any carry beyond the 4th bit.

The selector 373 in the clock signal selecting unit 370 is provided with delayed clock signal input terminals D0~D15 respectively connected to delayed clock signal output terminals DL0~DL15 of the delay circuit 360, select signal input terminals S0~S3 respectively connected to output terminals Q10~Q13 of the operating unit 372, and synchronization clock signal output terminal Y. Based on the select signal inputted from output terminals Q10~Q13 of the operating unit 372 into select signal input terminals S0~S3, the selector 373 selects one of delayed clock signals CLK0~CLK15 inputted in delayed clock signal input terminals D0~D15 and outputs the selected delayed clock signal from synchronization clock signal output terminal Y as synchronization clock signal SCLK. Here, delayed clock signal input terminal D0~D15 are arranged such that a delayed clock signal with longer delay time (i.e. a delayed clock signal which lags reception clock signal RCLK by a larger phase angle) is selected as synchronization clock signal SCLK with increase in the 4-bit binary code of the select signal. The specific operations of the operating unit 372 and selector 373 will be detailed later. Synchronization clock signal SCLK outputted from the selector 373 is supplied to the data converting unit 380.

The data converting unit 380 is provided with a start bit detecting unit 381 for detecting start bit data SB in serial data SD and a serial-parallel converting unit 382 for sequentially latching, based on detected start bit data SB, gradation data SPD for the specified length on the falling edges of synchronization clock signal SCLK and converting latched serial gradation data SPD into 8-bit parallel gradation data PD. Every time 8-bit parallel gradation data PD is generated, the data converting unit 380 outputs 8-bit parallel gradation data PD corresponding to a pixel, together with write signal WR.

The FIFO memory 390 stores 8-bit gradation data PD of one pixel in sync with write signal WR. Gradation data PD is then sent to a D/A convertor (not illustrated) to be converted into a driving signal of the LD.

The operation coefficient setting unit 330 detects a slight frequency error of reception clock signal RCLK of the oscillator 320 relative to frequency ftr. of the transmission clock signal in the image reading unit 10 based on start bit signal STB and reception clock signal RCLK, and outputs operation coefficient OPCO according to the detection result. The operation coefficient setting unit 330 is provided with the frequency detecting unit 340 for detecting frequency fre. of reception clock signal RCLK and the CPU 350 for controlling each component of the frequency detecting unit 340.

The CPU 350 holds data showing frequency ftr. of the transmission clock signal and a table showing the correspondence between a frequency difference of reception clock signal RCLK with the transmission clock signal and an operation coefficient (see Table 1 given later in this specification). The CPU 350 is also equipped with a ROM 351 for storing a control program controlling the frequency detecting unit 340 in advance, a RAM 352 for providing a work area for execution of the control program, and a timer 353. The CPU 350 executes a frequency detection and operation coefficient setting routine (described later) according to the control program, outputs count start signal START and count stop signal STOP at predetermined timings to determine operation coefficient OPCO, and outputs operation coefficient OPCO to the operating unit 372 in the clock signal selecting unit 370.

The AND gate 341 in the frequency detecting unit 340 outputs a logical product of start bit signal STB inputted from the start bit extracting unit 310 and count start signal START inputted from the CPU 350, to input terminal J of the JK-FF 343 and to clear input terminal CLR of the counter 344.

The AND gate 342 outputs a logical product of start bit signal STB inputted from the start bit extracting unit 310 and count stop signal STOP inputted from the CPU 350, to input terminal K of the JK-FF 343.

The JK-FF 343 is provided with input terminals J and K, clock input terminal CLK for receiving reception clock signal RCLK from the oscillator 320, and output terminal Q. If input terminal J is level H and input terminal K is level L on a rising edge of reception clock signal RCLK, the JK-FF 343 changes output terminal Q to level H. If input terminal J is level L and input terminal K is level H on the rising edge of reception clock signal RCLK, the JK-FF 343 changes output terminal Q to level L. If input terminals J and K are both level L on the rising edge of reception clock signal RCLK, output terminal Q remains unchanged.

The counter 344 is provided with clear input terminal CLR connected to the output of the AND gate 341, enable input terminal EN connected to output terminal Q of the JK-FF 343, clock input terminal CLK for receiving reception clock signal RCLK from the oscillator 320, and (N+1)-bit output terminal Q [N:0]. If clear input terminal CLR is level L and enable input terminal EN is level H, the counter 344 counts up the number of pulses of reception clock signal RCLK inputted in clock input terminal CLK. If clear input terminal CLR is level L and enable input terminal EN is level L, the counter 344 stops the count and output the count number of pulses via output terminal Q [N:0] as count number CNT. If clear input terminal CLR is level H, the counter 344 clears the count number of pulses regardless of the states of enable input terminal EN and clock input terminal CLK.

Figure 26:
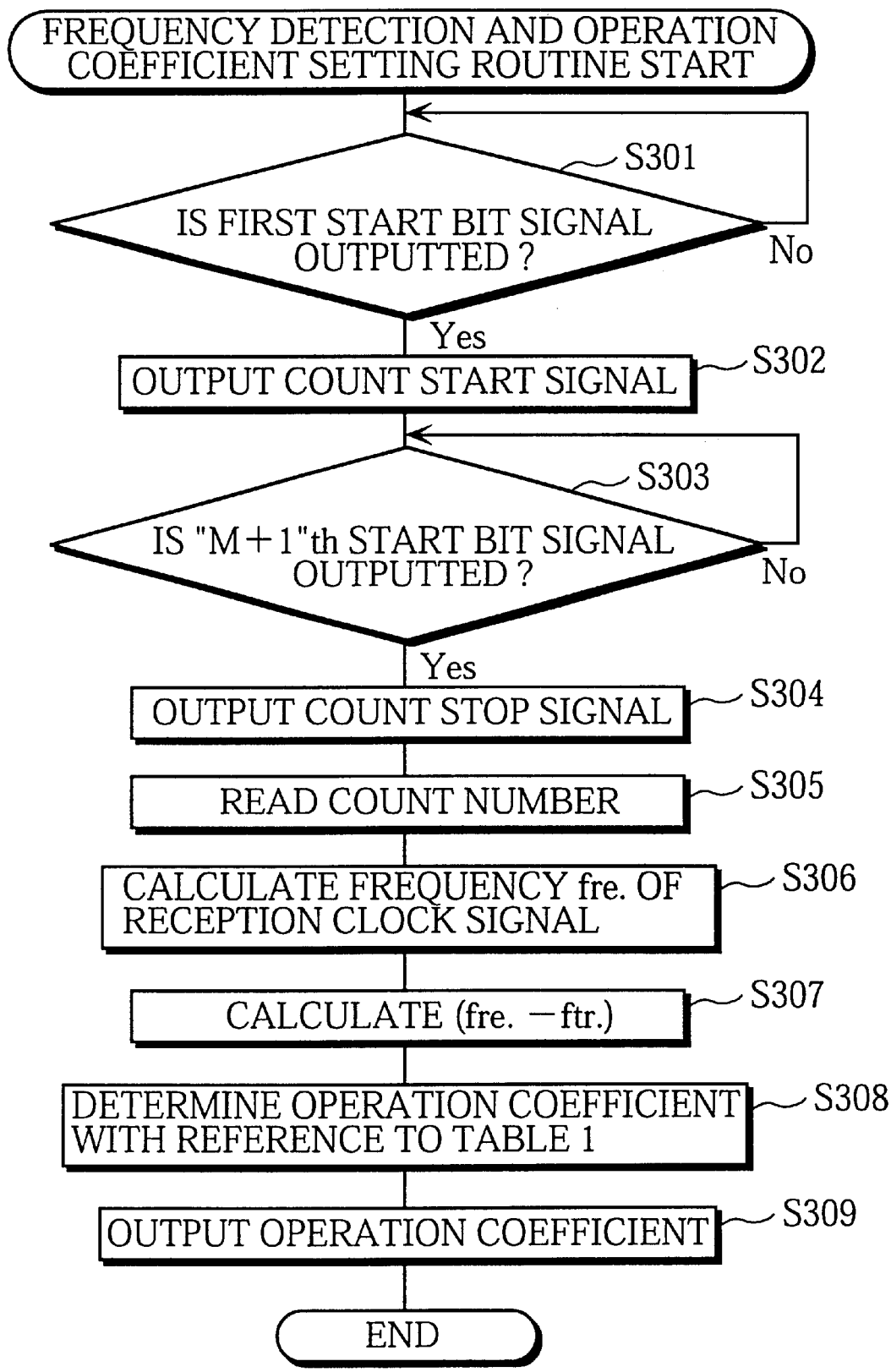
FIG. 26 is a flowchart showing the frequency detection and operation coefficient setting routine executed by a CPU in the data reception device.

The following is an explanation of the frequency detection and operation coefficient setting routine executed by the CPU 350, with reference to FIGS. 26 and 27 and Table 1. FIG. 26 is a flowchart showing the frequency detection and operation coefficient setting routine, whereas FIG. 27 shows waveforms of signals mainly used in the operation coefficient setting unit 330. This routine is executed each time communication with the image reading unit 110 starts or is executed at regular time intervals.

The CPU 350 outputs count start signal START of level H at timing of receiving the first start bit signal STB (S301 and S302) (see (a) and (b) in FIG. 27). This timing is found, for example, by calculating a frame period for one frame between two adjacent start bit signals STB beforehand, activating the timer 353 in sync with reception of start bit signal STB, and measuring time shortly before the lapse of the frame period up to shortly after the lapse of the frame period.

After the CPU 350 has outputted count start signal START, the AND gate 341 receives count start signal of level H and start bit signal STB of level H, so that the AND gate 341 outputs a signal of level H to J terminal of the JK-FF 343 and to clear input terminal CLR of the counter 344 while start bit signal STB is level H (see (d) in FIG. 27). Meanwhile, since count stop signal STOP sent from the CPU 350 is level L when the first start bit signal STB is level H (see (c) in FIG. 27), the output of the AND gate 342 remains level L (see (e) in FIG. 27). In the JK-FF 343 input terminal J is level H and input terminal K is level L on a rising edge of reception clock signal RCLK, and accordingly output terminal Q is changed to level H (see (f) in FIG. 27). Hence the counter 344 clears the count number in response to the output of level H from the AND gate 341 and then starts counting the number of pulses of reception clock signal RCLK in response to the output of level H from the JK-FF 343.

Subsequently, the CPU 350 outputs count stop signal STOP of level H at timing of receiving the "M+1"th start bit signal STB (S303 and S304) (see (a) and (c) in FIG. 27). This timing is found in the same way as the first start bit signal STB.

The AND gate 342 receives count stop signal STOP of level H and start bit signal STB of level H, and outputs a signal of level H to K terminal of the JK-FF 343 while start bit signal STB is level H (see (e) in FIG. 27). Meanwhile, since count start signal START sent from the CPU 350 is level L when the "M+1"th start bit signal STB is level H, the output of the AND gate 341 remains level L (see (d) in FIG. 27). In the JK-FF 343 input terminal J is level L and input terminal K is level H on a rising edge of reception clock signal RCLK, so that output terminal Q is changed to level L (see (f) in FIG. 27). The counter 344 stops counting the number of pulses of reception clock signal RCLK in response to the output of level L from the JK-FF 343. As a result, the total number of pulses of reception clock signal RCLK in M frames from the first start bit signal STB up to the "M+1"th start bit signal STB is counted. Note here that M has been set beforehand to a natural number (no less than 2) that is necessary for detecting, with a certain degree of accuracy, the frequency error (plus or minus several tens of ppm) of reception clock signal RCLK relative to the transmission clock signal (i.e. frequency error of a normal crystal oscillator).

The CPU 350 reads count number CNT via output terminal Q [N:0] of the counter 344 (S305) and divides count number CNT by M frame periods to calculate frequency fre. of reception clock signal RCLK (S306). The CPU 350 then subtracts frequency ftr. of the transmission clock signal stored in the ROM 351 from frequency fre. of reception clock signal RCLK to find a frequency difference (fre.−ftr.) (S307). Here, frequency ftr. stored in the ROM 351 may be a value predetermined for this serial transmission. However, in cases where an error of the frequency of the transmission clock signal matters, for more accurate data transfer it is desirable to measure frequency ftr. of the transmission clock signal beforehand and store it in the ROM 351.

On finding the frequency difference (fre.−ftr.), the CPU 350 refers to Table 1 held in the ROM 351.

TABLE 1

| frequency difference (decimal number:Hz) | operation coefficient (binary number) |
|---|---|
| (fre.−ftr.) > 10 | 0100 |
| 10 ≧ (fre.−ftr.) ≧ −10 | 0000 |
| −10 > (fre.−ftr.) | −0100 |

In Table 1, a positive 4-bit binary number "0100" showing a phase delay of 90° is associated as operation coefficient OPCO with (fre.−ftr.)>10 Hz, a 4-bit binary number "0000" showing no phase adjustment is associated with 10≧(fre.−ftr.)≧−10, and a negative 4-bit binary number "−0100" showing a phase advance of 90° is associated with (fre.−ftr.)<−10.

The above classification derives from the following reason. The error of frequency fre. of reception clock signal RCLK is at most around ±1000 Hz against 100 MHz, and the error of frequency ftr. of the transmission clock signal is extremely small. That is, if |(fre.−ftr.)| is as small as being in a range of ±10 Hz, a reading edge of synchronization clock signal SCLK does not shift almost at all in each bit time either in the phase advance direction or in the phase delay direction. In spite of this, it is necessary to detect the sign of (fre.−ftr.) over time by setting a large value to M. Accordingly, the above classification has been applied in order to detect the sign and absolute value of (fre.−ftr.) in a short time with a small value of M, thereby minimizing waste of time.

The CPU 350 finds operation coefficient OPCO to be given to the operating unit 372 with reference to Table 1 (S308). To be more specific, the CPU 350 selects the positive binary number "0100" if (fre.−ftr.)>10 Hz, the binary number "0000" if 10 Hz≧(fre.−ftr.)≧−10 Hz, and the negative binary number "−0100" if (fre.−ftr.)<−10 Hz. The CPU 350 then outputs operation coefficient OPCO to the operating unit 372 (S309) to complete the routine. Operation coefficient OPCO is stored in the operation coefficient storing unit 372a in the operating unit 372.

Next, the specific operations of the operating unit 372 and selector 373 when (fre.−ftr.)>10 Hz are explained in comparison to the conventional method, with reference to FIG. 25.

The conventional method includes neither the operating unit 372 nor the operation coefficient setting unit 330, and instead output terminals Q00~Q03 of the phase detecting unit 371 are connected to input terminals S0~S3 of the selector 373. Based on a select signal of a binary code ("0011" in FIG. 25) inputted from output terminals Q00~Q03 of the phase detecting unit 371, the selector 373 selects delayed clock signal CLK3 as synchronization clock signal SCLK. In the first bit time of serial data SD immediately after start bit signal STB a reading edge of synchronization clock signal SCLK lies in the center of the bit time where data setup time tsu1 and data hold time thold1 are approximately equal. However, in the last bit time of the frame each reading edge of synchronization clock signal SCLK advances over time due to a high degree of frequency fre. of reception clock signal RCLK, and as a result data setup time tsu1 becomes insufficiently short (see (d) in FIG. 25). Hence it is impossible to further increase the amount of data in the frame.

In comparison, in the present embodiment the operating unit 372 performs addition on the code "0011" inputted from output terminals Q00~Q03 of the phase detecting unit 371 and operation coefficient OPCO "0100" stored in the operation coefficient storing unit 372a when (fre.−ftr.)>10 Hz, and outputs the resulting binary code "0111" as a select signal to the selector 373. Based on this select signal "0111", the selector 373 selects delayed clock signal CLK7 that lags delayed clock signal CLK3 by 90° as synchronization clock signal SCLK. Accordingly, even when each reading edge of synchronization clock signal SCLK advances due to the high degree of frequency fre., in the last bit time of the frame data setup time tsu2 has a margin of 90° longer than the conventional method ((d) in FIG. 25). This enables the amount of data in the frame to be increased by the operation coefficient 90° compared with the conventional method, with it being possible to improve the data transfer efficiency.

When (fre.−ftr.)<−10 Hz, on the other hand, the operating unit 372 performs addition on the code "0011" inputted from the phase detecting unit 371 and operation coefficient OPCO "−0100" stored in the operation coefficient storing unit 372a, and outputs the resulting binary code "1111" as a select signal. Based on this select signal the selector 373 selects delayed clock signal CLK15 which leads delayed clock signal CLK3 by 90° as synchronization clock signal SCLK. Accordingly, even when each reading edge of synchronization clock signal SCLK delays over time due to a low degree of frequency fre. of reception clock signal RCLK, in the last bit time of the frame data hold time thold2 has a margin of 90° greater than the conventional method. This enables the amount of data in the frame to be increased by the operation coefficient 90° compared with the conventional method, with it being possible to improve the data transfer efficiency.

The following are possible modifications of the third embodiment.

While in the above embodiment frequency fre. of reception clock signal RCLK has been formed based on the detection result of the frequency detecting unit 340, it is also possible to detect frequency fre. beforehand and store data showing frequency fre. in the ROM 351. In this case, the frequency detecting unit 340 in FIG. 23 and steps S301~S306 in FIG. 26 are omitted, so that not only the configuration of the data reception device 300 can be simplified but the operation coefficient can be obtained in a very short time. Here, to check whether each reading edge of synchronization clock signal SCLK shifts in the phase advance direction or in the phase delay direction, in Table 1 the frequency difference (fre.−ftr.) may be classified according to its sign.

While in the above embodiment 16 delayed clock signals have been generated by the delay circuit 360 using the phase difference $2\pi/16$, other values such as 32 and $2\pi/32$ may be used as the number of delayed clock signals and the phase difference, respectively. In doing so, the maximum error $2\pi/16$ between the reading edge of a delayed clock signal outputted from the phase detecting unit 371 in binary code and the center of the first bit time, caused by the asynchronous serial transmission, is reduced accordingly and so the operation coefficient is changed. As a result, the amount of data in a frame can further be increased.

While the above first to third embodiments have described the serial data transfer from the image reading unit to the printing unit, the present invention can also be applied to data transfer from the image reading unit to a FAX unit (not illustrated). Also, the effective data may not necessarily be gradation data but may be textual or other data.

While the above embodiments have described the monochrome copier equipped with the single photosensitive drum, the present invention is also applicable to a color copier with a single photosensitive drum, a tandem copier with a plurality of photosensitive drums, a printer, a FAX, or an image forming apparatus that combines these machines.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A data reception device for receiving serial data including a plurality of frames which each include synchronization data and effective data, the data reception device comprising:
   a reception clock signal generator which generates a reception clock signal whose frequency is approximately equal to a frequency of a transmission clock signal, the reception clock signal being asynchronous to the transmission clock signal;
   a delayed clock signal outputting unit which outputs, in accordance with the synchronization data, a delayed clock signal whose phase approximately matches a phase of the transmission clock signal, the delayed clock signal being created by delaying a phase of the reception clock signal;
   an adjustment amount obtaining unit which obtains a phase adjustment amount according to a frequency difference of the reception clock signal with the transmission clock signal; and
   a setting unit which sets a synchronization clock signal for capturing effective data included in each of the plurality of frames, in accordance with the phase adjustment amount and the delayed clock signal.

2. The data reception device of claim 1,
   wherein the delayed clock signal outputting unit creates a plurality of delayed clock signals that are equal to the reception clock signal in frequency and different from the reception clock signal in phase, and outputs, in accordance with the synchronization data, one of the plurality of delayed clock signals whose phase approximately matches the phase of the transmission clock signal.

3. The data reception device of claim 1,
   wherein the adjustment amount obtaining unit has a table in which frequency differences are associated with phase adjustment amounts, and obtains the phase adjustment amount with reference to the table.

4. An image forming apparatus that is provided with a data reception device for receiving serial data including a plurality of frames which each include synchronization data and effective data, the data reception device comprising:
   a reception clock signal generator which generates a reception clock signal whose frequency is approximately equal to a frequency of a transmission clock signal, the reception clock signal being asynchronous to the transmission clock signal;
   a delayed clock signal outputting unit which outputs, in accordance with the synchronization data, a delayed clock signal whose phase approximately matches a phase of the transmission clock signal, the delayed clock signal being created by delaying a phase of the reception clock signal;
   an adjustment amount obtaining unit which obtains a phase adjustment amount according to a frequency difference of the reception clock signal with the transmission clock signal; and
   a setting unit which sets a synchronization clock signal for capturing effective data included in each of the plurality of frames, in accordance with the phase adjustment amount and the delayed clock signal.

5. The image forming apparatus of claim 4,
   wherein the effective data includes image data, and
   wherein the image forming apparatus is provided with an image forming unit which forms an image according to the image data received by the data reception device.

6. The image forming apparatus of claim 5, further provided with:
   an image reader which reads a document image to obtain the image data; and
   a data transmission device which transmits the image data obtained by the image reader to the data reception device.

7. A data reception device for receiving serial data including a plurality of frames that each include synchronization data and effective data, the data reception device comprising:
   a reception clock signal generator which generates a reception clock signal whose frequency is approximately equal to a frequency of a transmission clock signal, the reception clock signal being asynchronous to the transmission clock signal;
   a delayed clock signal creating unit which delays a phase of the reception clock signal to create a plurality of delayed clock signals that are equal to the reception clock signal in frequency and different from the reception clock signal in phase;
   an adjustment amount computing unit which computes a phase adjustment amount according to a frequency difference of the reception clock signal with the transmission clock signal; and
   a selecting unit which selects, in accordance with the phase adjustment amount, one of the plurality of delayed clock signals as a synchronization clock signal for capturing effective data included in each of the plurality of frames.

8. The data reception device of claim 7, further comprising
   a determining unit which determines one of the plurality of delayed clock signals whose phase approximately matches a phase of the transmission clock signal, in accordance with the synchronization data,
   wherein the selecting unit selects one of the plurality of delayed clock signals as the synchronization clock signal using the determined delayed clock signal as a reference, in accordance with the phase adjustment amount.

9. The data reception device of claim 8,
   wherein the synchronization data includes start bit data, and
   wherein the determining unit determines one of the plurality of delayed clock signals whose phase approximately matches a phase of the start bit data.

10. An image forming apparatus that is provided with a data reception device for receiving serial data including a plurality of frames which each include synchronization data and effective data, the data reception device comprising:

a reception clock signal generator which generates a reception clock signal whose frequency is approximately equal to a frequency of a transmission clock signal, the reception clock signal being asynchronous to the transmission clock signal;

a delayed clock signal creating unit which delays a phase of the reception clock signal to create a plurality of delayed clock signals that are equal to the reception clock signal in frequency and different from the reception clock signal in phase;

an adjustment amount computing unit which computes a phase adjustment amount according to a frequency difference of the reception clock signal with the transmission clock signal; and a selecting unit which selects, in accordance with the phase adjustment amount, one of the plurality of delayed clock signals as a synchronization clock signal for capturing effective data included in each of the plurality of frames.

11. A data reception method for receiving serial data including a plurality of frames that each include synchronization data and effective data, the data reception method comprising the steps of:

a) generating a reception clock signal whose frequency is approximately equal to a frequency of a transmission clock signal, the reception clock signal being asynchronous to the transmission clock signal;

b) delaying a phase of the reception clock signal to create a plurality of delayed clock signals that are equal to the reception clock signal in frequency and different from the reception clock signal in phase;

c) computing a phase adjustment amount according to a frequency difference of the reception clock signal with the transmission clock signal;

d) selecting, in accordance with the phase adjustment amount, one of the plurality of delayed clock signals as a synchronization clock signal for capturing effective data included in each of the plurality of frames; and e) capturing the effective data according to the synchronization clock signal.

* * * * *